(12) United States Patent
Nishikuma et al.

(10) Patent No.: US 8,672,013 B2
(45) Date of Patent: Mar. 18, 2014

(54) APPARATUS FOR HANDLING MAGNET

(75) Inventors: Yasushi Nishikuma, Toyota (JP); Yasuji Taketsuna, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 225 days.

(21) Appl. No.: 13/387,657

(22) PCT Filed: Jul. 29, 2009

(86) PCT No.: PCT/JP2009/063460
§ 371 (c)(1),
(2), (4) Date: Jan. 27, 2012

(87) PCT Pub. No.: WO2011/013209
PCT Pub. Date: Feb. 3, 2011

(65) Prior Publication Data
US 2012/0125969 A1    May 24, 2012

(51) Int. Cl.
*B29C 65/72* (2006.01)
*B29C 65/78* (2006.01)
*B29C 65/56* (2006.01)
*B32B 37/10* (2006.01)
*B32B 37/12* (2006.01)
*B32B 38/10* (2006.01)

(52) U.S. Cl.
USPC ........... 156/517; 156/510; 156/516; 156/538; 156/578

(58) Field of Classification Search
USPC .................................. 156/510–534, 538, 578
See application file for complete search history.

(56) References Cited

FOREIGN PATENT DOCUMENTS

| JP | 61-079505 A | 5/1986 |
|---|---|---|
| JP | 11-004555 A | 1/1999 |
| JP | 2002-018797 A | 1/2002 |
| JP | 2007-142002 A | 6/2007 |
| JP | 2007-166888 A | 6/2007 |
| JP | 2008-113530 A | 5/2008 |
| JP | 2009-142081 A | 6/2009 |
| JP | 2010-252514 A | 11/2010 |
| WO | 2012/131988 A1 | 10/2010 |
| WO | WO 2012131988 A1 * | 10/2012 |

OTHER PUBLICATIONS

English translation of WO 2011/013209.*
English translation of WO 2012/131988.*
English translation of JP 04-331100.*
International Search Report of PCT/JP2009/063460 mailed Oct. 20, 2009.

* cited by examiner

*Primary Examiner* — Sonya Mazumdar
(74) *Attorney, Agent, or Firm* — Kenyon & Kenyon LLP

(57) ABSTRACT

An apparatus for handling a magnet handles a plurality of split magnets obtained by sequentially splitting a magnet to be split from one end thereof. The apparatus for handling a magnet is equipped with a mechanism which arranges a split magnet with respect to a previously split magnet so that the magnets are put on top of one another and the corresponding irregularities of a pair of split surfaces thereof are arranged opposite each other. The apparatus for handling a magnet is also equipped with a section where the plurality of split magnets are arranged.

18 Claims, 21 Drawing Sheets

APPARATUS FOR HANDLING MAGNET

CROSS-REFERENCE TO RELATED APPLICATIONS

This is a 371 national phase application of PCT/JP2009/063460 filed on 29 Jul. 2009, the entire contents of which are incorporated herein by reference.

FIELD OF THE INVENTION

The present invention relates to a magnet handling apparatus for handling a plurality of split magnets obtained by splitting or dividing apart a pre-splitting magnet.

BACKGROUND OF THE INVENTION

A magnet insertion apparatus for inserting magnets in magnet installation holes of a rotor is known as a conventional magnet handling apparatus. Patent Document 1, for example, discloses such a magnet insertion apparatus. The magnet material insertion apparatus described in Patent Document 1 first inclines a rotor core placed on a table together with the table to an angle at which the magnet parts do not slide down inside the magnet hole (magnet installation hole) of the rotor core. After that, the magnet material is inserted into the magnet hole in this inclined state. After the magnet material has been inserted, the table and the rotor core are returned to a horizontal state (see claims, etc. of Patent Document 1).

RELATED ART DOCUMENTS

Patent Documents

Patent Document 1: JP2008-113530A

SUMMARY OF THE INVENTION

Problems to be Solved by the Invention

In some motors, a plurality of magnets are inserted in each of the magnet installation holes formed in a motor component to reduce loss caused by eddy currents. Meanwhile, to obtain such plurality of magnets, there is known a technique for obtaining a plurality of magnets (split magnets) by forming a long piece of magnet first and then splitting it apart for cost reduction or the like.

However, split magnets obtained by the splitting have irregular split surfaces, which differ in shape from one another. Therefore, if a plurality of split magnets are aligned such that their split surfaces contact each other in a random order, there will be gaps between the split surfaces of adjacent split magnets, resulting in the total length of the aligned split magnets being larger than the total length of the pre-splitting magnet. Also, since the size of gaps between split surfaces of adjacent split magnets is not constant, there will be a large variation in the total length of the aligned split magnets.

As a result, when the aligned split magnets are assembled to a motor component by being inserted into a magnet insertion hole thereof, there may be instances where the aligned split magnets cannot be assembled to the motor component because of the total length of the magnets being too large. Conversely, an attempt to set the total length of the pre-splitting magnet shorter in consideration of the risk of the total length of aligned split magnets becoming too large would reduce the amount of magnet inserted into the motor component, leading to a decrease in power output of the motor. There is also a risk that different states of split magnets inserted in each of the magnet insertion holes caused by the variation in the total length of aligned split magnets may lead to variations in performance of resultant motors.

The present invention was devised in view of such circumstances and has an object to provide a magnet handling apparatus for handling a plurality of split magnets obtained by splitting apart a pre-splitting magnet, with which the total length of aligned split magnets can be reduced by making smaller the gaps between the split surfaces of adjacent split magnets, as well as variation in total length of aligned split magnets can be reduced.

Means of Solving the Problems

To achieve the above object, one aspect of the present invention provides a magnet handling apparatus for handling a plurality of split magnets obtained by sequentially splitting apart a pre-splitting magnet from one end thereof, wherein the apparatus includes a magnet alignment mechanism configured to align the split magnets such that a subsequently split magnet closely contacts a previously split magnet in an arrangement where a pair of split surfaces formed by the splitting have their matching irregularities facing each other, and the magnet alignment mechanism includes: a magnet splitting part configured to split the pre-splitting magnet; and a magnet transfer part including a transfer member to push and move the subsequently split magnet split by the magnet splitting part to contact the previously split magnet.

In this magnet handling apparatus, the magnet alignment mechanism aligns the split magnets such that a subsequently split magnet is closely contacted to a previously split magnet in an arrangement where a pair of split surfaces formed by the splitting face each other so that their projections and depressions (irregularities) engage with corresponding opposite depressions and projections. This enables the split magnets to be fitted together without any large gaps between the pair of split surfaces, and there will be no large variation in the size of gaps between each pair of adjacent split magnets. Therefore, with the use of this magnet handling apparatus, gaps between the split surfaces of split magnets can be made smaller, whereby the total length of aligned split magnets can be reduced. Also, variation in total length of aligned split magnets can be reduced.

Furthermore, in this magnet handling apparatus, the magnet alignment mechanism includes the magnet splitting part for splitting the pre-splitting magnet. Accordingly, in a single apparatus, a series of operations including splitting of the pre-splitting magnet to aligning of the split magnet obtained by the splitting can be performed. Thus, the apparatus can have a simple configuration.

Further, the above-described magnet handling apparatus preferably includes a magnet placement part configured to hold the plurality of split magnets in an aligned state, and the magnet alignment mechanism is configured to align the split magnets sequentially inside the magnet placement part.

This magnet handling apparatus includes the magnet placement part, and aligns split magnets inside this magnet placement part, so that the respective split magnets can appropriately be held in an aligned state inside this magnet handling apparatus.

Examples of the "magnet placement part" include tubular configurations or rail-like configurations with a U-shaped cross section so as to be able to hold a plurality of split magnets in an aligned state.

Further, the above-described magnet handling apparatus preferably includes a motor component holder configured to hold a motor component in a predetermined attitude, the motor component having a magnet installation hole for holding the plurality of split magnets in an aligned state, and the magnet alignment mechanism is configured to align the split magnets sequentially inside the magnet installation hole of the motor component held by the motor component holder.

This magnet handling apparatus includes the motor component holder described above, and aligns split magnets inside a magnet installation hole of a motor component held by this motor component holder, so that split magnets can be arranged inside the magnet installation hole of the motor component in this magnet handling apparatus. Namely, the magnet handling apparatus saves the steps of taking out the aligned split magnets therefrom and inserting them into a magnet installation hole of a motor component.

Examples of "motor component" include a rotor having a magnet installation hole, or a stator having a magnet installation hole.

Further, any of the above-described magnet handling apparatuses preferably includes an adhesive applying part configured to apply adhesive on at least one of the pair of split surfaces prior to the alignment of the subsequently split magnet.

This magnet handling apparatus includes an adhesive applying part. This adhesive applying part applies adhesive on at least one of the pair of split surfaces prior to the previously-described alignment of a subsequently split magnet. Thus the plurality of split magnets can be united, as adjacent split magnets are fixed to each other by bonding or gluing. Accordingly, as this magnet handling apparatus can process the magnets until the split magnets are united, handling of the split magnets can be made easy. Alternatively, if the respective split magnets are to be arranged inside a magnet installation hole of a motor component, the respective split magnets can be prevented from being misaligned inside the magnet installation hole.

Further, any of the above-described magnet handling apparatuses preferably includes a tape bonding mechanism configured to attach an adhesive tape provided with an adhesive layer on one side thereof over the plurality of split magnets in an aligned state.

This magnet handling apparatus includes a tape bonding mechanism. This tape bonding mechanism can unite a plurality of split magnets as it attaches an adhesive tape over these split magnets in an aligned state. This magnet handling apparatus can therefore process the magnets until the split magnets are united, making the handling of split magnets easy.

Further, any of the above-described magnet handling apparatuses preferably includes a total length measuring part configured to measure a total length of the split magnets in a magnet alignment direction while the split magnets are in an aligned state.

This magnet handling apparatus includes a total length measuring part. Thereby, the total length of aligned split magnets can be measured and inspected about whether it falls within a permissible range.

Further, in any of the above-described magnet handling apparatuses, preferably, the magnet alignment mechanism includes a magnet splitting part configured to split apart the pre-splitting magnet.

This magnet handling apparatus has a magnet splitting part in the magnet alignment mechanism for splitting apart the pre-splitting magnet. The apparatus can thus be made simple since it can perform, within one apparatus, a series of operations from the splitting of the pre-splitting magnet to the alignment of split magnets obtained by the splitting.

Further, any of the above-described magnet handling apparatuses preferably includes an air blow part configured to blow air to each of the pair of split surfaces prior to the alignment of the subsequently split magnet.

This magnet handling apparatus includes an air blow part that blows air to split surfaces. Therefore, any magnet fragments produced during the splitting are removed from the split surfaces. After that, the subsequently split magnet is aligned such that the split magnets contact each other as previously-described, which prevents situations where magnet fragments enter between a pair of split surfaces to increase the gap therebetween, or to increase variation in total length of aligned split magnets.

Air may be blown simultaneously or separately to each of the pair of split surfaces. The air may be blown immediately after splitting apart the pre-splitting magnet, or during transfer after the splitting for the alignment of split magnets.

Further, in any of the above-described magnet handling apparatus, preferably, the magnet placement part is configured to separate any magnet fragments produced from the split magnets therefrom.

In this magnet handling apparatus, the magnet placement part is configured to separate any magnet fragments produced from split magnets therefrom. This prevents situations where magnet fragments produced from split magnets enter between a pair of split surfaces of adjacent split magnets to increase the gap therebetween, or to increase variation in total length of aligned split magnets. Example configurations of such magnet placement part include, for example, a slit or groove provided in the magnet placement part where magnet fragments separate from split magnets and drop down through the slit or accumulate in the groove.

Another aspect provides A magnet handling method for handling a plurality of split magnets obtained by sequentially splitting apart a pre-splitting magnet from one end thereof, wherein the method includes a magnet alignment step of aligning split magnets such that a subsequently split magnet contacts a previously split magnet in an arrangement where the pair of split surfaces formed by the splitting have their matching irregularities facing each other.

With this magnet handling method, in the magnet alignment step, the split magnets are aligned such that a subsequently split magnet is closely contacted to a previously split magnet in an arrangement where the pair of split surfaces formed by the splitting face each other so that their projections and depressions (irregularities) engage with corresponding opposite depressions and projections. This enables the split magnets to be fitted together without any large gaps between the pair of split surfaces, and there will be no large variation in the size of gaps between each pair of adjacent split magnets. Therefore, with this magnet handling method, gaps between the split surfaces of split magnets can be made smaller, whereby the total length of aligned split magnets can be reduced. Also, variation in total length of aligned split magnets can be reduced.

Further, in the above-described magnet handling method, the magnet alignment step preferably includes a gluing step of gluing the split magnets to each other by applying adhesive on at least one of the pair of split surfaces prior to the alignment of the subsequently split magnet.

With this magnet handling method, in the gluing step of the magnet alignment step, adhesive is applied on at least one of the pair of split surfaces prior to the previously-described alignment of a subsequently split magnet. Thus the plurality of split magnets can be united, as adjacent split magnets are fixed to each other by gluing. Accordingly, handling of the split magnets thereafter can be made easy. Alternatively, if the respective split magnets are to be arranged inside a magnet installation hole of a motor component, the respective split magnets are prevented from being misaligned inside the magnet installation hole.

Further, the above-described magnet handling method preferably includes a fixing step of fixing the plurality of split magnets to each other in an aligned state by attaching an adhesive tape having an adhesive layer on one side thereof over these split magnets.

With this magnet handling method, in the fixing step, an adhesive tape is attached over the plurality of split magnets in an aligned state, so that the plurality of split magnets can be united. Accordingly, handling of the split magnets thereafter can be made easy.

DESCRIPTION OF THE REFERENCE SIGNS

Figure 1:
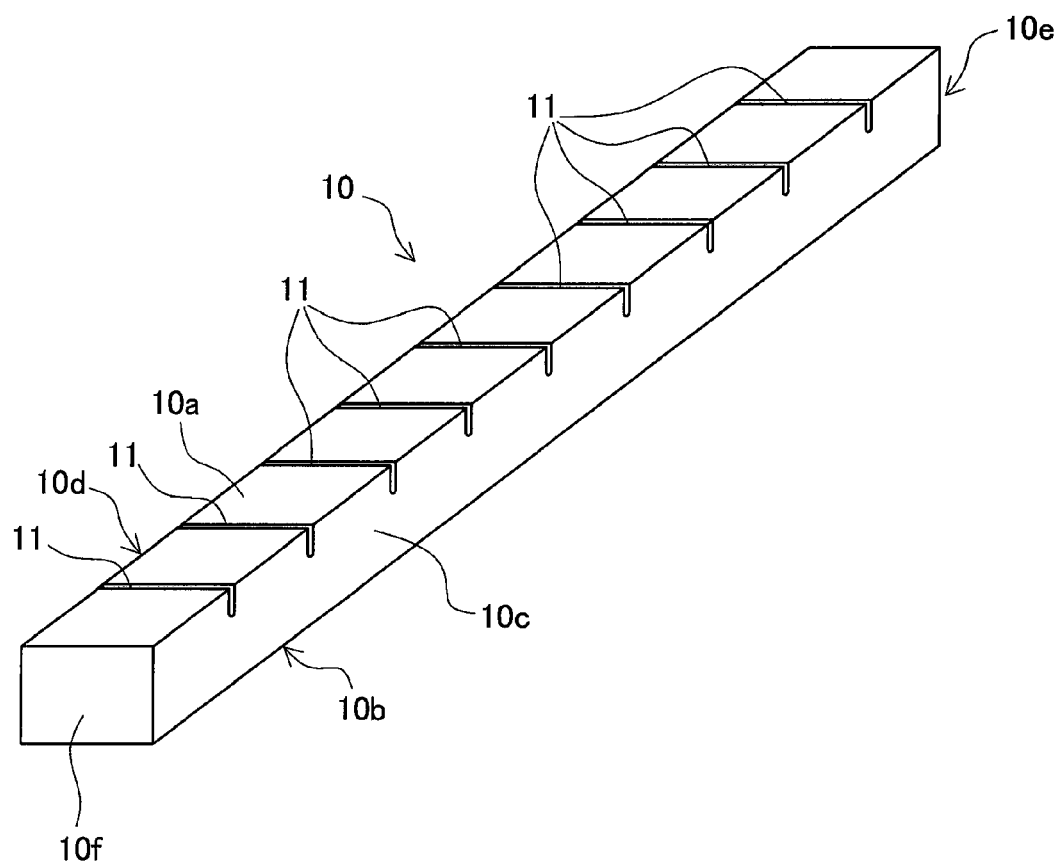
FIG. 1 is a perspective view of a pre-splitting magnet in a first embodiment.

10 Pre-splitting magnet
11 Splitting groove
20 Split magnet
20e First split surface
20f Second split surface
50 Rotor (Motor component)
50h Magnet installation hole
100, 200, 300 Magnet handling apparatus
101 Magnet alignment mechanism
110 Magnet splitting portion
111 One-side holder
121 Other-side holder
130, 230 Magnet placement part
131 Magnet transfer and alignment part
133 Fragment discharge part
140 Magnet transfer part
150 Adhesive applying part
160 Total length measuring part
170 Air blow part
250 Tape bonding mechanism
380 Motor member holder
LA Total length
SZ Adhesive
ST Adhesive tape
SS Adhesive layer

DETAILED DESCRIPTION (Embodiment 1)

Figure 2:
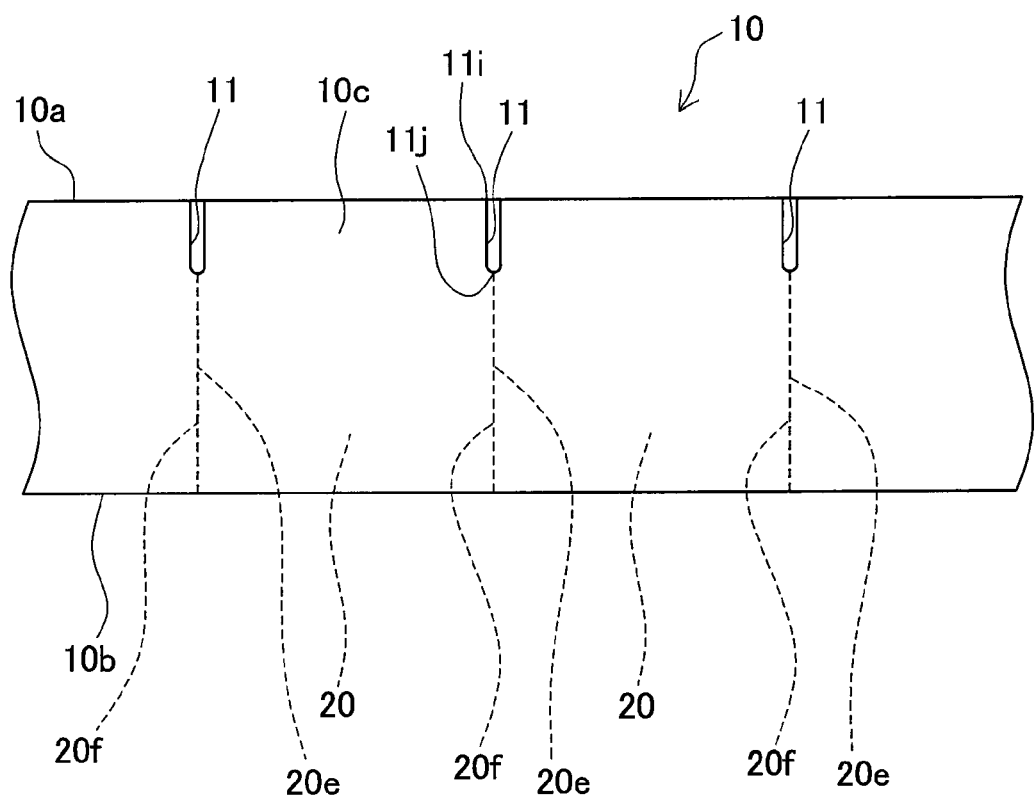
FIG. 2 is an enlarged side view of the pre-splitting magnet in the first embodiment.
Figure 3:
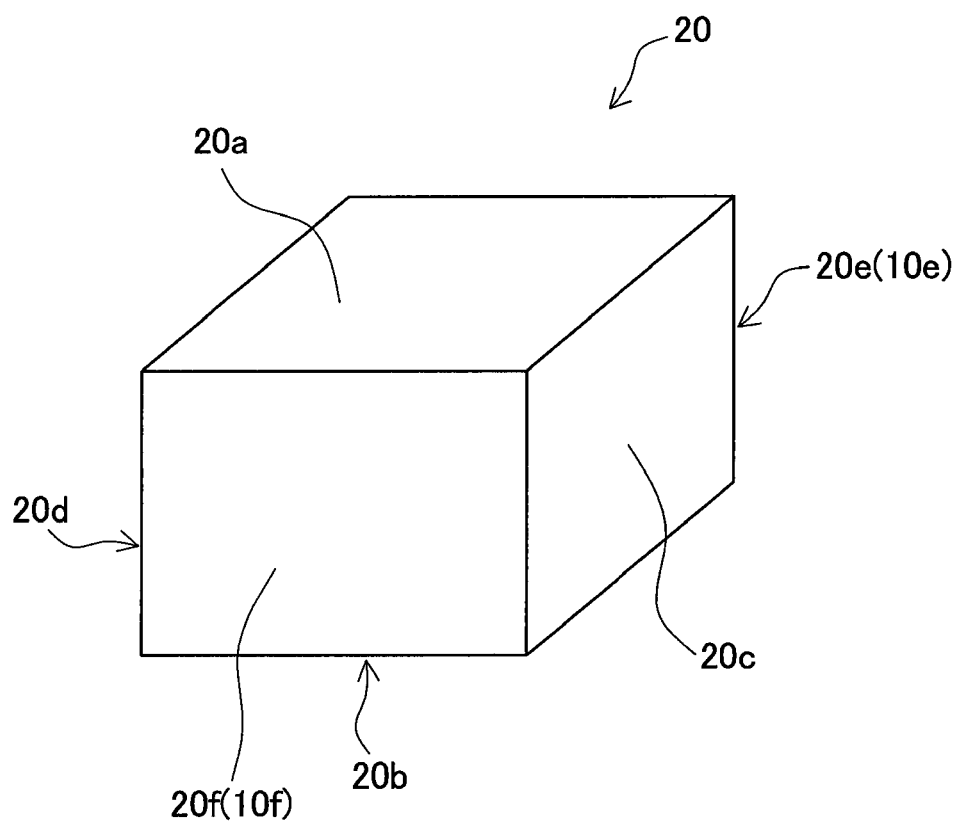
FIG. 3 is a perspective view of a split magnet in the first embodiment.
Figure 4:
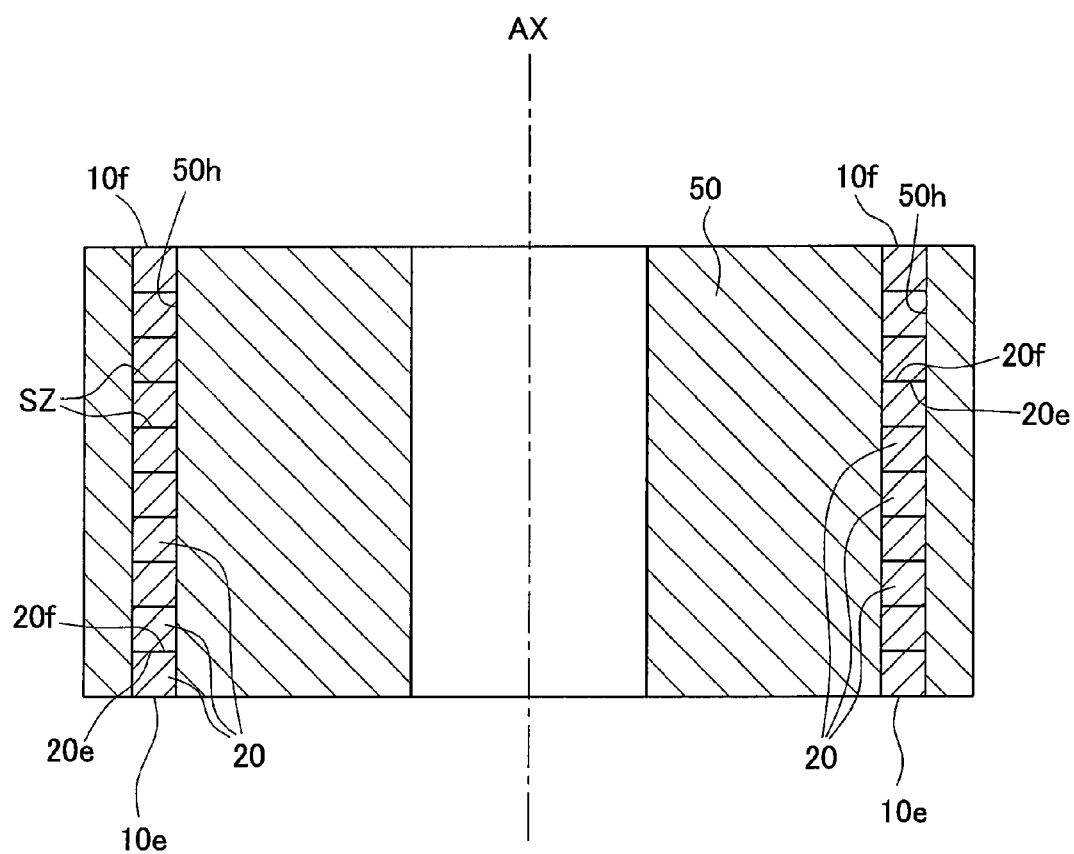
FIG. 4 is a longitudinal cross-sectional view of a rotor constituting a motor in the first embodiment, showing a state where a number of split magnets are inserted in magnet installation holes.

Hereinafter, embodiments of the present invention will be described with reference to the drawings. FIGS. 1 and 2 show a pre-splitting magnet 10 used in Embodiment 1, and FIG. 3 shows a split magnet 20 obtained by splitting the pre-splitting magnet 10. FIG. 4 shows a rotor (a motor component) 50 in which the split magnets 20 are used and which constitutes a motor (not shown). FIGS. 5 to 12 show a magnet handling apparatus 100 according to Embodiment 1.

The pre-splitting magnet 10 to be split apart in Embodiment 1 is a rare earth magnet made of a sintered metal material and it is not yet magnetized. This pre-splitting magnet 10 has a rectangular parallelepiped shape with a first main surface 10a, a second main surface 10b parallel thereto, and a third side face 10c, a fourth side face 10d, a fifth side face 10e, and a sixth side face 10f connecting the main surfaces (see FIGS. 1 and 2). The third side face 10c and the fourth side face 10d are parallel to each other, and the fifth side face 10e and the sixth side face 10f are parallel to each other.

Of these, the first main surface 10a is formed with a plurality of splitting grooves 11 which will be the starting points when this pre-splitting magnet 10 is split or divided apart (see FIGS. 1 and 2). These splitting grooves 11 have a substantially U-shaped cross section, and are formed from the third side face 10c to the fourth side face 10d in a manner that they are parallel with the short side direction of the first main surface 10a and respectively orthogonal to the third side face 10c and fourth side face 10d. These splitting grooves 11 are regularly spaced from and arranged parallel to each other.

Splitting this pre-splitting magnet 10 along the splitting grooves 11 as the starting points produces a plurality of (ten in Embodiment 1) split magnets 20 (see FIG. 3). This split magnet 20 has a rectangular parallelepiped shape with a first split main surface 20a corresponding to the first main surface 10a; a second split main surface 20b corresponding to the second main surface 10b; a third split side face 20c corresponding to the third side face 10c; a fourth split side face 20d corresponding to the fourth side face 10d; and a first split surface 20e and a second split surface 20f, which are two newly formed split surfaces, substantially parallel to each other. The split magnet 20 obtained from one end of the pre-splitting magnet 10 has the fifth side face 10e instead of the first split surface 20e, while the split magnet 20 obtained from the other end of the pre-splitting magnet 10 has the sixth side face 10f instead of the second split surface 20f.

These split magnets 20 are used in a motor (not shown). More specifically, these magnets are inserted by two or more in each of a plurality of magnet installation holes 50h formed in the rotor (motor component) 50 that forms the motor (see FIG. 4). The rotor 50 is of a cylindrical shape having an axis line AX. A plurality of (ten in Embodiment 1) split magnets 20 corresponding to one pre-splitting magnet 10 are inserted in each magnet installation hole 50h of the rotor 50. The plurality of split magnets 20 inserted in the magnet installation hole 50h are aligned in the same order as they were before the pre-splitting magnet 10 was split apart. Adjacent split magnets 20 are bonded with adhesive SZ to each other in a state where their first split surface 20e and second split surface 20f that were connected before the splitting contacting each other. Inserting more than one of the split magnets 20 in each of the magnet installation holes 50h of the rotor 50 can help reduce eddy current loss in magnets in the motor using these magnets.

Next, the magnet handling apparatus 100 according to Embodiment 1 will be described (see FIGS. 5 to 12). This magnet handling apparatus 100 is an apparatus for handling a plurality of split magnets 20 obtained by sequentially splitting apart a pre-splitting magnet 10 from one end thereof, and includes a magnet alignment mechanism 101 for aligning the split magnets 20. This magnet alignment mechanism 101 includes a magnet splitting part 110 and a magnet transfer part 140. The magnet handling apparatus 100 of Embodiment 1 also includes a magnet placement part 130, an adhesive applying part 150, a total length measuring part 160, and an air blow part 170.

Figure 5:
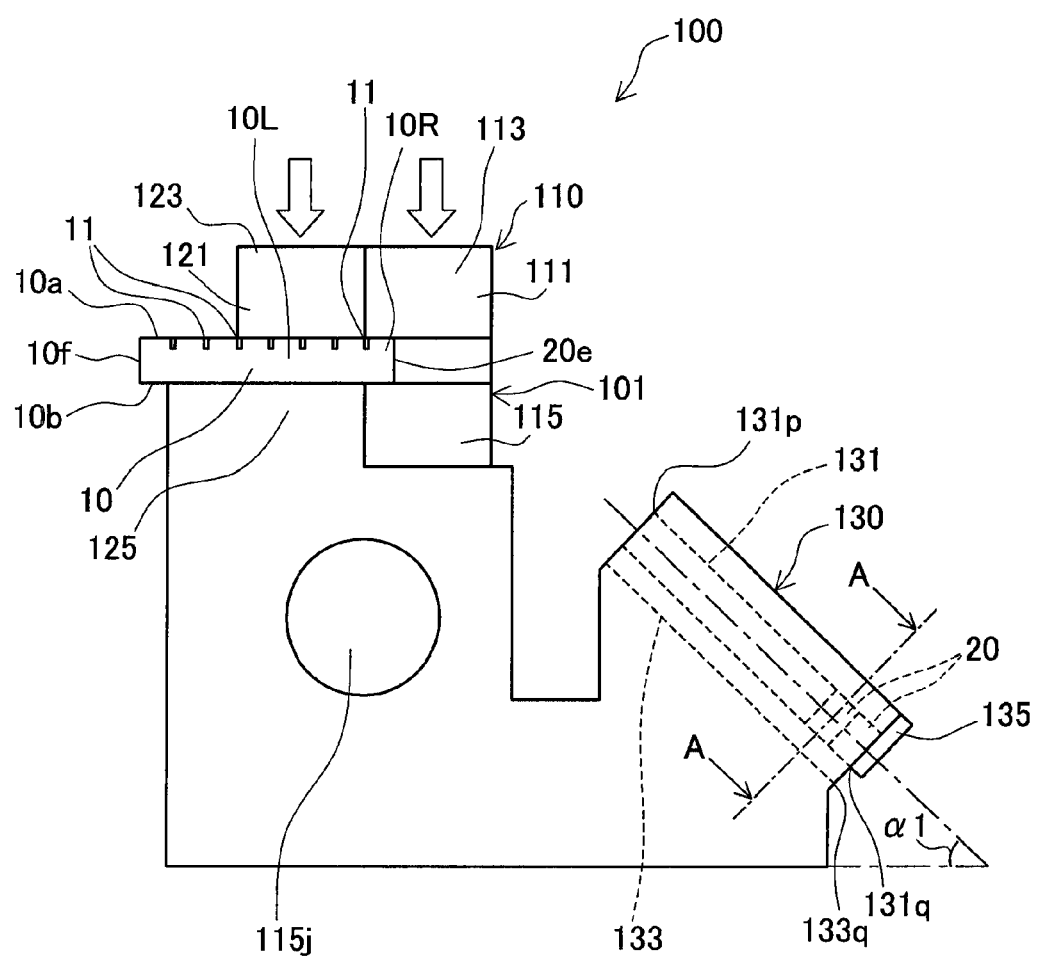
FIG. 5 is an explanatory view to show a magnet handling apparatus in the first embodiment, showing a state where the pre-splitting magnet is held.

Of these, the magnet splitting part 110 is configured to hold a pre-splitting magnet 10 at a predetermined position and then split it apart to produce split magnets 20. More specifically, the magnet splitting part 110 includes, as shown in FIG. 5, a one-side holder 111 for holding an end region 10R of the pre-splitting magnet 10 corresponding to one split magnet located on one side of the splitting groove 11, and an other-side holder 121 for holding a remaining part 10L located on the other side. These one-side holder 111 and other-side holder 121 are configured, as will be described later, to split apart the pre-splitting magnet 10 along the splitting groove 11 as the starting point by means of a relative movement of the one-side holder 111 relative to the other-side holder 121 in such a manner as to widen an opening 11i of each splitting groove 11 more than a bottom part 11j thereof (see FIG. 2).

The one-side holder 111 has a first one-side holding part 113 positioned in an upper part and a second one-side holding part 115 positioned lower than the former. The first one-side holding part 113 is disposed movably in up and down directions so that when holding the pre-splitting magnet 10, the holding part 113 comes in contact with the first main surface 10a of the pre-splitting magnet 10 from above and presses the same downwards. The second one-side holding part 115 has a rotation shaft 115j and is disposed rotatably around this rotation shaft 115j as the center. The rotation shaft 115j is arranged to extend in a direction that is horizontal and parallel to the splitting grooves 11 of the pre-splitting magnet 10 when this magnet 10 is set in the magnet handling apparatus 100. The second one-side holding part 115 comes in contact with the second main surface 10b of the pre-splitting magnet 10 from below when holding the magnet 10. The one-side holder 111 thus sandwiches and holds the pre-splitting magnet 10 (the end region 10R) between its first one-side holding part 113 and second one-side holding part 115.

The other-side holder 121 includes a first other-side holding part 123 positioned in an upper part and a second other-side holding part 125 positioned lower than the former. The first other-side holding part 123 is disposed movably in the up and down direction so that when holding a pre-splitting magnet 10, it comes in contact with the first main surface 10a of the pre-splitting magnet 10 from above and presses the same downwards. The second other-side holding part 125 is fixedly disposed at a predetermined position in the magnet handling apparatus 100 so that when holding the pre-splitting magnet 10, the holding part 125 comes in contact with the second main surface 10b of the pre-splitting magnet 10 from below. The other-side holder 121 thus sandwiches and holds the pre-splitting magnet 10 (the remaining part 10L) between its first other-side holding part 123 and second other-side holding part 125.

For splitting the pre-splitting magnet 10, the second one-side holding part 115 of the one-side holder 111 is rotated clockwise in FIG. 5 around the rotation shaft 115j as the center, which causes the entire one-side holder 111 to rotate clockwise in FIG. 5 around the rotation shaft 115j as the center while maintaining the state of holding the pre-splitting magnet 10 (the end region 10R). Meanwhile, the other-side holder 121 does not move, so that this rotation of the one-side holder 111 (movement relative to the other-side holder 121) widens the opening 11i of the splitting groove 11 between the end region 10R and the remaining part 10L more than the bottom part 11j thereof, whereby the pre-splitting magnet 10 is split apart along this splitting groove 11 as the starting point.

Figure 6:
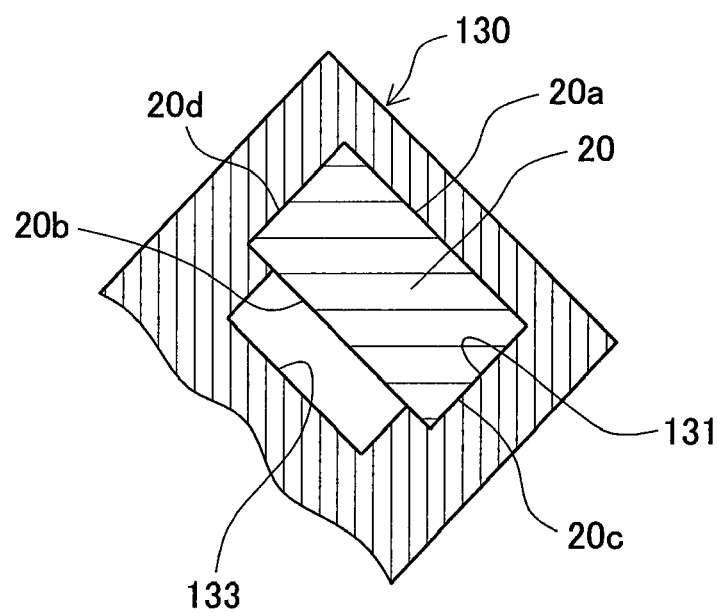
FIG. 6 is a cross-sectional view of the magnet handling apparatus in the first embodiment, taken along a line A-A in FIG. 5.

Next, the magnet placement part 130 will be described (see FIGS. 5 and 6). The magnet placement part 130 is fixedly disposed at a predetermined position in the magnet handling apparatus 100 and configured to hold a plurality of split magnets 20 obtained by the splitting in an aligned state. The magnet placement part 130 is also designed to separate magnet fragments produced from the split magnets 20 therefrom. More specifically, the magnet placement part 130 is of a tubular shape and, in its inside, has a magnet transfer and alignment part 131 and a fragment discharge part 133 (see FIG. 6).

The magnet transfer and alignment part 131 forms a rectangular parallelepiped space in which the split magnets 20 can move in a longitudinal direction thereof. This magnet transfer and alignment part 131 can accommodate a plurality of (ten in this embodiment) split magnets 20 corresponding to one pre-splitting magnet 10 aligned in the same state as before the splitting. This magnet transfer and alignment part 131 is disposed to be inclined (at an angle of α1) relative to the horizontal direction such that an entrance 131*p* thereof is oriented obliquely upwards and an exit 131*q* thereof is oriented obliquely downwards. An open/close door 135 that can open and close this exit 131*q* is attached to the exit 131*q* of the magnet transfer and alignment part 131.

The fragment discharge part 133 has a square U-shaped cross section and is arranged under and along the magnet transfer and alignment part 131. The space formed by the fragment discharge part 133 is continuous with the space formed by the magnet transfer and alignment part 131. Any magnet fragments produced by the splitting and pushed into the magnet transfer and alignment part 131 with the split magnets 20 or entering the magnet transfer and alignment part 131 separately from the split magnets 20 drop down from the magnet transfer and alignment part 131 to be separated from the split magnets 20 and are discharged into the fragment discharge part 133. The magnet fragments then slide down inside the fragment discharge part 133 and are discharged to the outside of the apparatus from an exit 133*q* of the fragment discharge part 133.

Next, the magnet transfer part 140 will be described (see FIG. 9). The magnet transfer part 140 moves the split magnets 20 individually from the one-side holder 111 of the magnet splitting part 110 and pushes them into the magnet transfer and alignment part 131 of the magnet placement part 130. It then aligns the split magnets 20 such that a subsequently split magnet 20 is contacted to a previously split magnet 20 in an arrangement where the pair of split surfaces (first split surface 20*e* and second split surface 20*f*) formed by the splitting have their matching irregularities facing each other.

More specifically, this magnet transfer part 140 has a rod-like transfer member 141. This transfer member 141 pushes the second split surface 20*f* of a split magnet 20 held by the one-side holder 111 of the magnet splitting part 110 toward the magnet placement part 130 to move this split magnet 20 from the one-side holder 111 into the magnet placement part 130 and further obliquely downwards inside the magnet placement part 130. The transfer member then brings this split magnet 20 into contact with another split magnet 20 previously split off and accommodated inside the magnet placement part 130 prior to this split magnet 20 so as to align the respective split magnets 20 inside the magnet placement part 130. Namely, the transfer member aligns the respective split magnets 20 inside the magnet placement part 130 such as to contact each other in an arrangement where the first split surface 20*e* of a subsequently inserted split magnet 20 and the second split surface 20*f* of a previously accommodated split magnet 20 face each other so that their projections and depressions (irregularities) engage with corresponding opposite depressions and projections.

Next, the adhesive applying part 150 will be described (see FIG. 10). The adhesive applying part 150 is configured to apply adhesive SZ on the second split surface 20*f* of a split magnet 20 previously accommodated inside the magnet placement part 130 prior to the alignment of a subsequently split magnet 20 using the above-described magnet transfer part 140. More specifically, the adhesive applying part 150 includes a rod-like nozzle 151 and can dispense the adhesive SZ from a dispensing tip 151*s* located at the distal end of the nozzle. The adhesive applying part 150 brings its nozzle 151 close to or into contact with the second split surface 20*f* of a split magnet 20 already accommodated inside the magnet placement part 130, and dispenses the adhesive SZ from the dispensing tip 151*s* thereafter to apply the adhesive on the second split surface 20*f* of the split magnet 20.

Next, the total length measuring part 160 will be described (see FIG. 11). The total length measuring part 160 is configured to be able to measure the total length LA in the magnet alignment direction of a plurality of aligned split magnets 20, for example, ten aligned split magnets 20 corresponding to one pre-splitting magnet 10. More specifically, the total length measuring part 160 has a rod-like measurement insert 161, which is brought into contact with the sixth side face 10*f* of the split magnet 20 that is lastly accommodated in the magnet placement part 130 thereby to measure the total length LA of the aligned split magnets 20.

Next, the air blow part 170 will be described (see FIG. 7). The air blow part 170 is configured to blow air to the pair of first split surface 20*e* and the second split surface 20*f* formed by the splitting after the pre-splitting magnet 10 has been split apart. More specifically, the air blow part 170 is disposed above the magnet splitting part 110 so that it blows air from above to each of the first split surface 20*e* and the second split surface 20*f* formed by the splitting at the same time.

Next, handling of magnets by the magnet handling apparatus 100 will be described in more specific terms.

First, the pre-splitting magnet 10 is set in this magnet handling apparatus 100. Namely, the one-side holder 111 and the other-side holder 121 of the magnet splitting part 110 respectively hold one side (right side in FIG. 5) and the other side (left side in FIG. 5) of the splitting groove 11 of the pre-splitting magnet 10. More specifically, the one-side holder 111 holds one side of the splitting groove 11 located closest to the fifth side face 10*e* of the pre-splitting magnet 10, which is an end region 10R corresponding to one split magnet 20 located at the fifth side face 10*e*, while the other-side holder 121 holds the remaining part 10L that is the rest of the pre-splitting magnet.

FIG. 5 shows a moment when two split magnets 20 have already been split off and a third split magnet 20 is going to be split off. Therefore, the one-side holder 111 is holding an end region 10R located at the first split surface 20*e* (right side), which is on one side of the splitting groove 11 located closest to the first split surface 20*e* (far right in FIG. 5) of the pre-splitting magnet 10, while the other-side holder 121 is holding the remaining part 10L.

When holding the pre-splitting magnet 10, the first one-side holding part 113 of the one-side holder 111 comes in contact with the first main surface 10*a* of the pre-splitting magnet 10 from above and presses the same downward, while the second one-side holding part 115 comes in contact with the second main surface 10*b* of the pre-splitting magnet 10 from below. The first one-side holding part 113 and the second one-side holding part 115 thus sandwich the pre-splitting magnet 10 therebetween.

The first other-side holding part 123 of the other-side holder 121 comes in contact with the first main surface 10*a* of the pre-splitting magnet 10 from above and presses the same downward, while the second other-side holding part 125 comes in contact with the second main surface 10*b* of the pre-splitting magnet 10 from below. The first other-side holding part 123 and the second other-side holding part 125 thus sandwich the pre-splitting magnet 10 therebetween.

Figure 7:
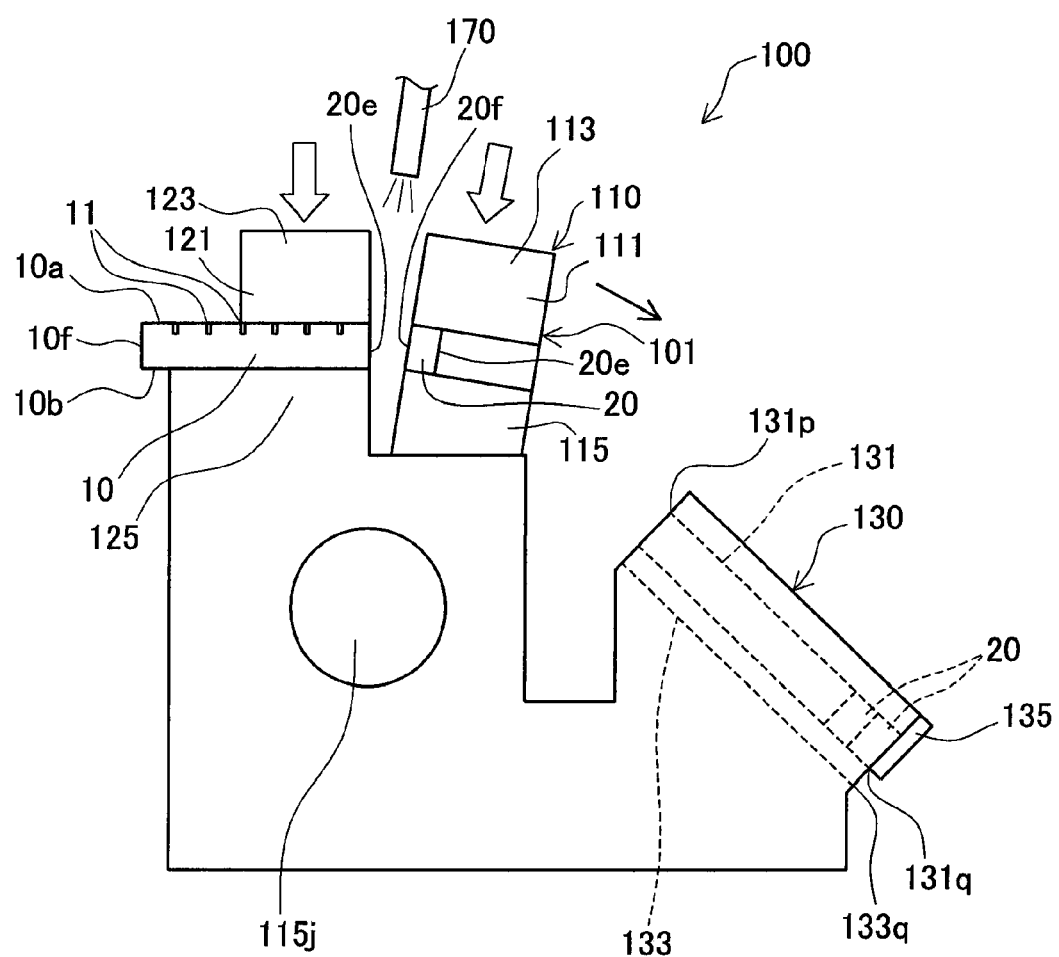
FIG. 7 is an explanatory view to show a state of splitting the pre-splitting magnet and further blowing air thereto in the first embodiment.

After being held with the magnet splitting part 110, the pre-splitting magnet 10 is split apart along the splitting groove 11 as the starting point as shown in FIG. 7 by a relative movement of the one-side holder 111 relative to the other-side holder 121 in such a manner as to widen the opening 11*i* of the splitting groove 11 more than the bottom part 11*j* thereof (see FIG. 2).

More specifically, the second one-side holding part 115 of the one-side holder 111 is rotated clockwise in FIG. 7 around the rotation shaft 115*j* as the center, which causes the entire one-side holder 111 to rotate clockwise in FIG. 7 around the rotation shaft 115*j* as the center while maintaining the state of holding the pre-splitting magnet 10. Meanwhile, the other-side holder 121 does not move, so that this rotation of the one-side holder 111 (movement relative to the other-side holder 121) widens the opening 11*i* of the splitting groove 11 more than the bottom part 11*j* thereof, whereby the pre-splitting magnet 10 is split apart along the splitting groove 11 as the starting point. Split magnets 20 are thus obtained.

After the splitting, the air blow part 170 blows air from above to each of the pair of split surfaces formed by the splitting (the first split surface 20*e* of the pre-splitting magnet 10 and the second split surface 20*f* of the split magnet 20) to blow away any magnet fragments that may have been produced during the splitting from the first split surface 20*e* and the second split surface 20*f*.

Figure 8:
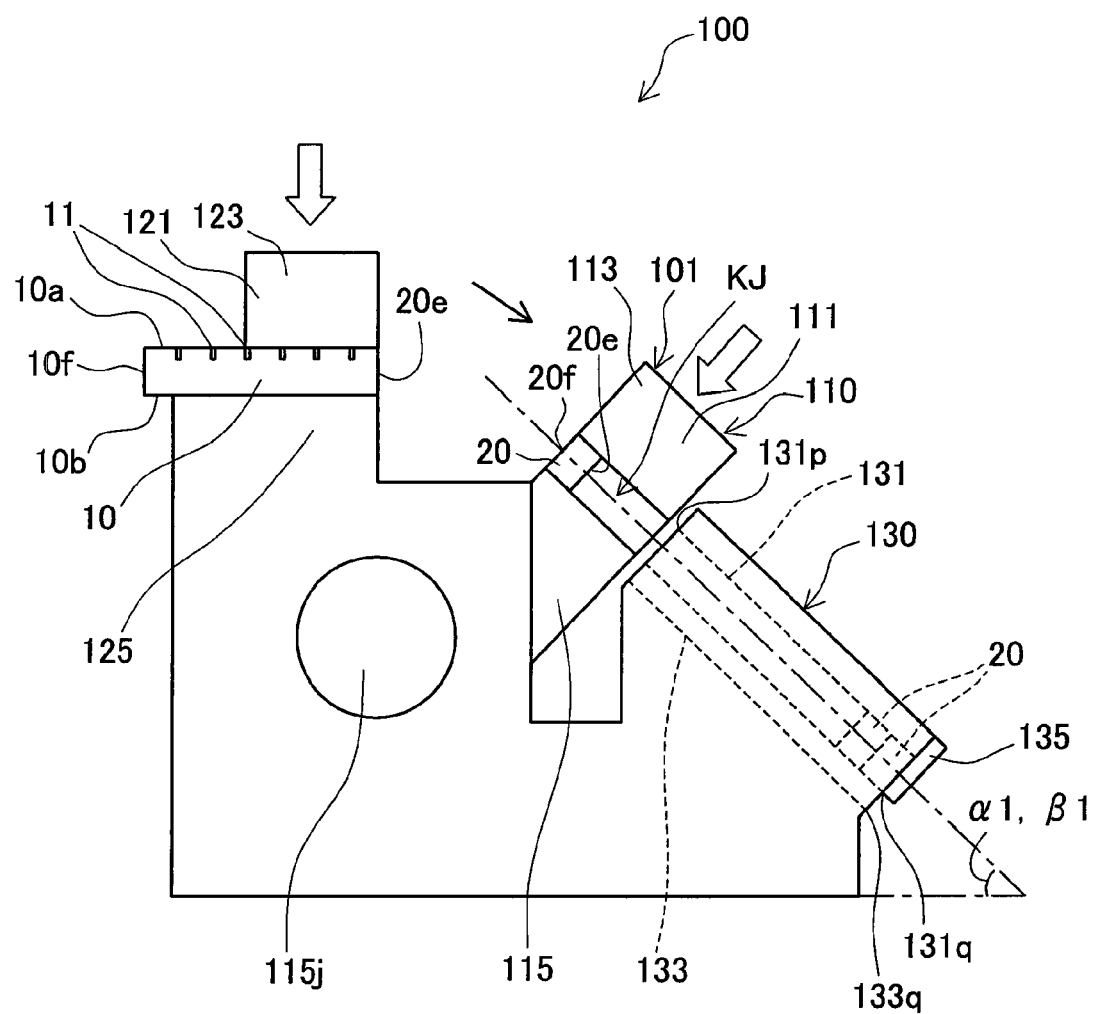
FIG. 8 is an explanatory view to show a state of rotating a one-side holder to the vicinity of a magnet placement part in the first embodiment.

Next, the entire one-side holder 111 is rotated further clockwise in FIG. 8 around the rotation shaft 115*j* as the center while maintaining the state of holding the split magnet 20 obtained by the splitting, so as to locate the one-side holder 111 near the magnet placement part 130. In this state, a magnet holding space KJ formed between the first one-side holding part 113 and the second one-side holding part 115 in the one-side holder 111 has an inclination angle β1 relative to the horizontal direction matching the inclination angle α1 of the magnet transfer and alignment part 131 of the previously-described magnet placement part 130, and is continuous with the magnet transfer and alignment part 131 with a small gap therebetween.

Figure 9:
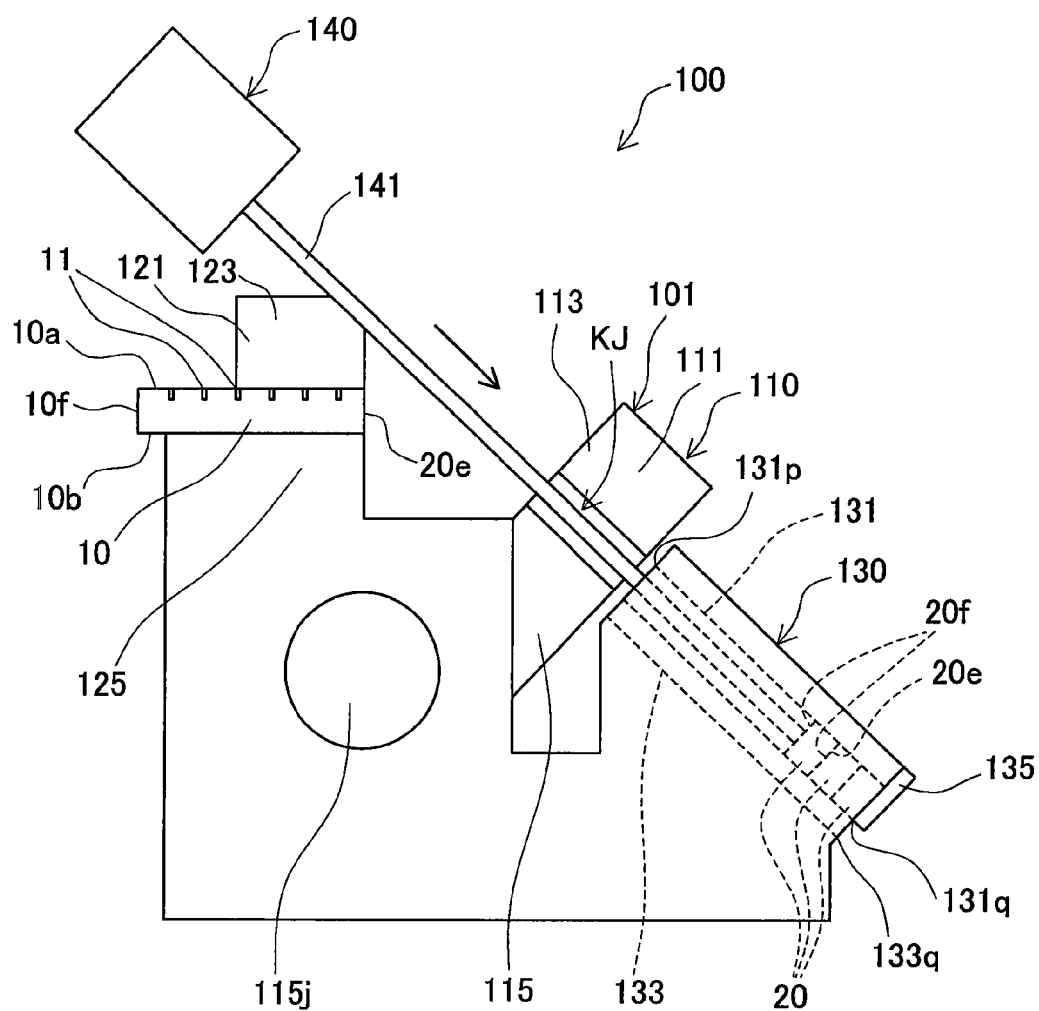
FIG. 9 is an explanatory view to show a state of moving the split magnets from the one-side holder into the magnet placement part so that the split magnets are aligned in the first embodiment.

Next, with the transfer member 141 of the magnet transfer part 140, the split magnet 20 obtained by the splitting is moved from the magnet holding space KJ of the one-side holder 111 and pushed into the magnet transfer and alignment part 131 of the magnet placement part 130 (see FIG. 9). Inside the magnet transfer and alignment part 131, the split magnets 20 are aligned in the same order as they were before the splitting, with the pair of split surfaces (first split surface 20*e* and second split surface 20*f*), formed by the splitting, of adjacent split magnets 20 contacting each other (this corresponding to the previously-described magnet alignment step).

More specifically, at the same time as the holding of the split magnet 20 by the one-side holder 111 is released, the transfer member 141 of the magnet transfer part 140 is moved and inserted into the magnet holding space KJ of the one-side holder 111. This transfer member 141 pushes the second split surface 20*f* of the split magnet 20 inside the magnet holding space KJ toward the magnet transfer and alignment part 131 of the magnet placement part 130 to move this split magnet 20 from the magnet holding space KJ into the magnet transfer and alignment part 131 and further obliquely downward inside the magnet transfer and alignment part 131.

This split magnet 20 is then brought into contact with another split magnet 20 that has been accommodated inside the magnet placement part 130 before this split magnet 20 and thus respective split magnets 20 are aligned inside the magnet placement part 130 (the magnet transfer and alignment part 131). Namely, the respective split magnets 20 inside the magnet transfer and alignment part 131 are aligned to contact each other in an arrangement where the first split surface 20*e* of a split magnet 20 split off this time and the second split surface 20*f* of a previously split magnet 20 have their matching irregularities facing each other. At this time, since the adhesive SZ has been applied on the second split surface 20*f* of the previously split magnet 20, the first split surface 20*e* of the split magnet 20 split off this time and the second split surface 20*f* of the previously split magnet 20 are bonded to each other, so that adjacent split magnets 20 are fixed to each other (this being part of the previously-described gluing step). To spread the adhesive SZ between the first split surface 20*e* and the second split surface 20*f* to enhance adhesiveness therebetween, it is preferable to press the split magnet 20 split off this time with the transfer member 141 of the magnet transfer part 140. After the respective split magnets 20 have been aligned, the transfer member 141 of the magnet transfer part 140 is retracted.

Figure 10:
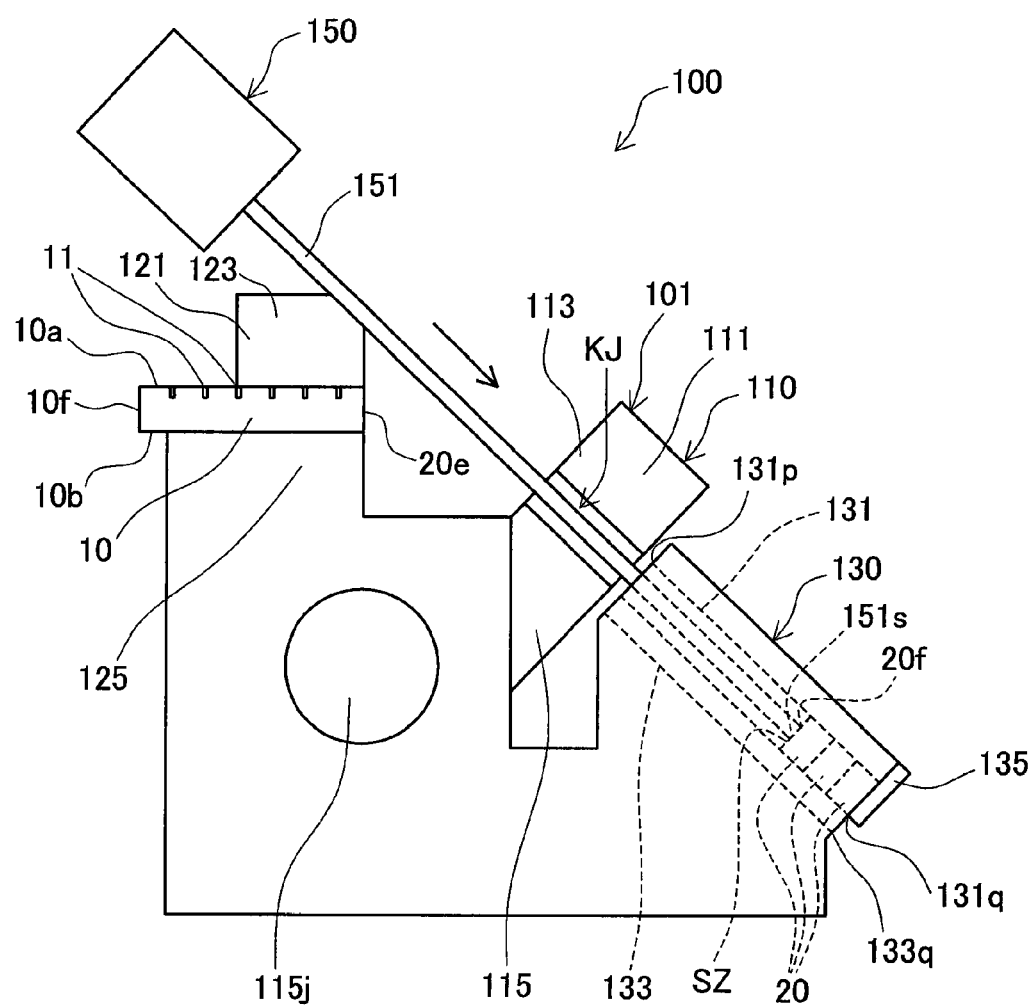
FIG. 10 is an explanatory view to show a state of applying an adhesive to second split surfaces of the split magnets accommodated in the magnet placement part in the first embodiment.

Next, as shown in FIG. 10, with the adhesive applying part 150, adhesive SZ is applied on the second split surface 20*f* of the above-described split magnet 20 accommodated inside the magnet transfer and alignment part 131 of the magnet placement part 130. More specifically, the nozzle 151 of the adhesive applying part 150 is inserted into the magnet transfer and alignment part 131 of the magnet placement part 130. The dispensing tip 151*s* of the nozzle 151 is then brought close to or into contact with the second split surface 20*f* of the above-described split magnet 20. After that, the adhesive SZ is dispensed from the dispensing tip 151*s* and applied on the second split surface 20*f* of this split magnet 20 (this being part of the previously-described gluing step). After the adhesive SZ has been applied, the nozzle 151 of the adhesive applying part 150 is retracted. By thus applying adhesive SZ beforehand, a subsequently accommodated split magnet 20 and the current split magnet 20 can be bonded to each other.

Next, the one-side holder 111 is rotated counterclockwise in FIG. 10 around the rotation shaft 115*j* as the center to return the one-side holder 111 to its initial position as shown in FIG. 5. The holding of the pre-splitting magnet 10 by the other-side holder 121 is released so that the remaining pre-splitting magnet 10 can move to the right side in FIG. 5 toward the one-side holder 111 by a length of one split magnet 20.

Thereafter, the remaining pre-splitting magnet 10 is held again with the one-side holder 111 and the other-side holder 121 to be split apart further. After that, the split magnet 20 newly obtained by the splitting is moved into the magnet placement part 130 and aligned (magnet alignment step). This is repeated until the original pre-splitting magnet 10 is split apart into ten split magnets 20 in total. Since adjacent split magnets 20 are bonded to each other as described above, the plurality of aligned split magnets 20 are united.

Figure 11:
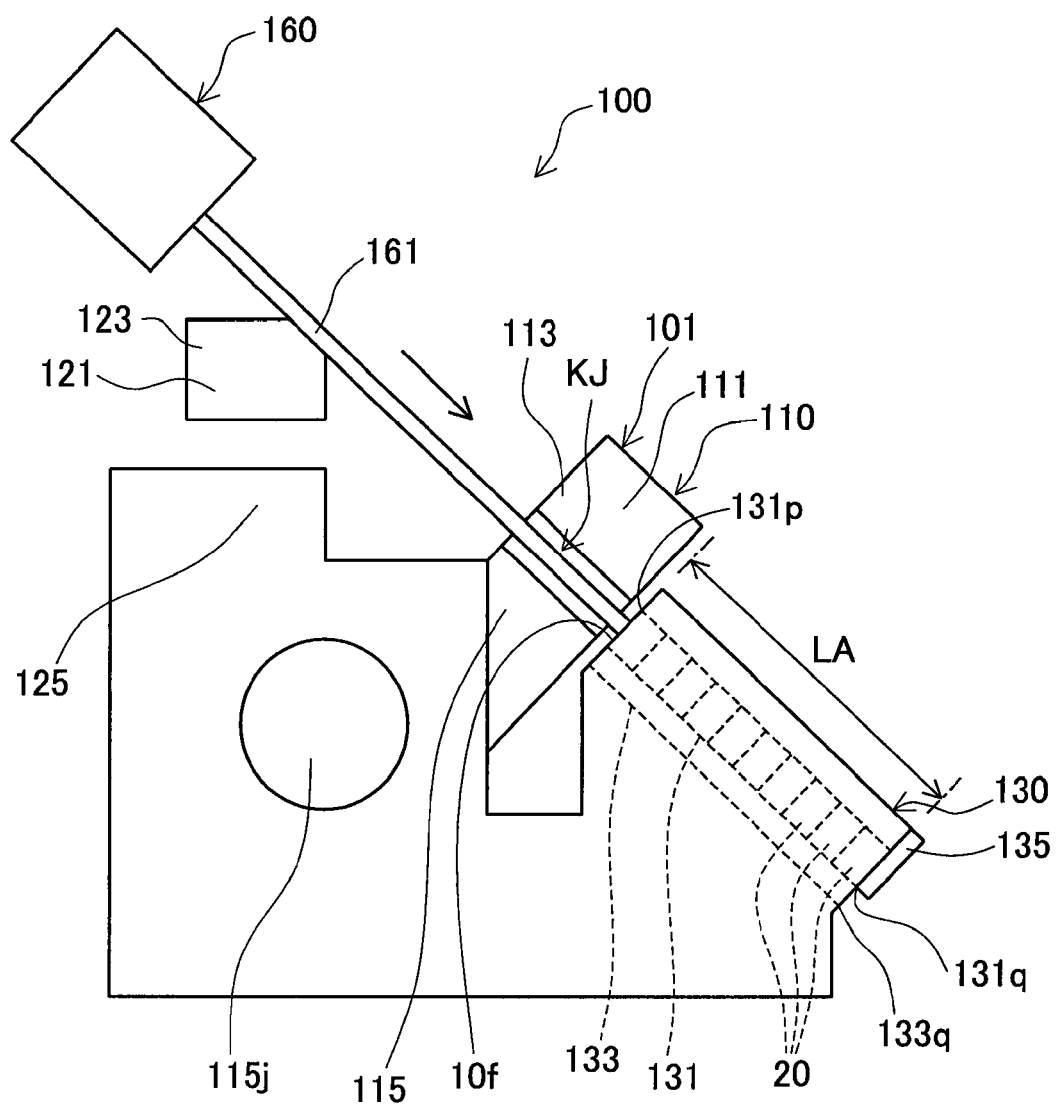
FIG. 11 is an explanatory view to show a state of measuring the total length of the split magnets accommodated in the magnet placement part in the first embodiment.

After ten split magnets 20 corresponding to one original pre-splitting magnet 10 have been accommodated inside the magnet placement part 130, the total length measuring part 160 measures the total length LA of the aligned split magnets 20 as shown in FIG. 11. More specifically, the measurement insert 161 of the total length measuring part 160 is moved to the magnet transfer and alignment part 131 of the magnet placement part 130 and brought into contact with the sixth side face 10*f* of the split magnet 20 that is lastly accommodated in the magnet placement part 130. Thereby the total length LA of the aligned split magnets 20 is measured. After the total length LA has been measured, the measurement insert 161 of the total length measuring part 160 is retracted.

Figure 12:
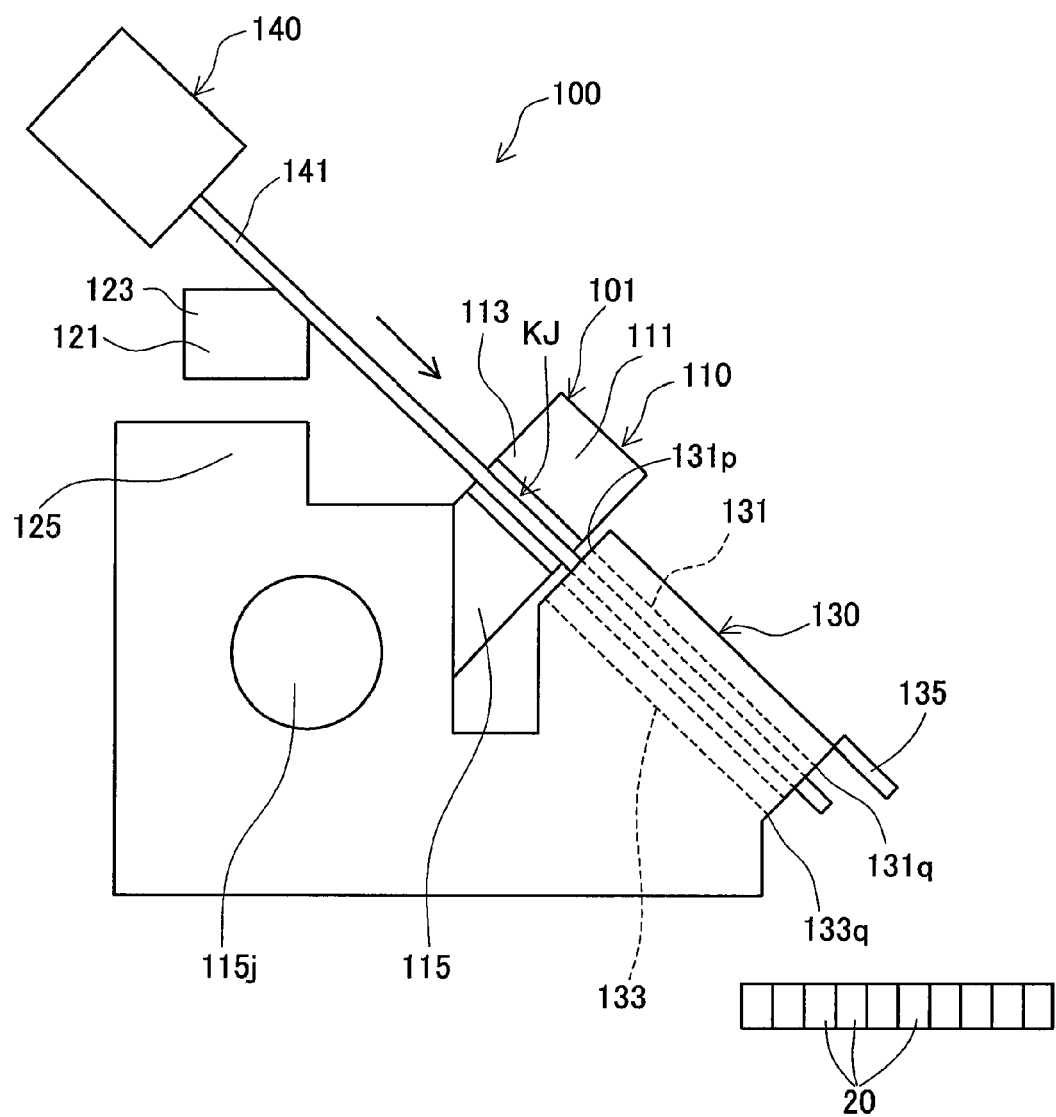
FIG. 12 is an explanatory view to show a state of discharging the united split magnets from the magnet placement part in the first embodiment.

Next, the magnet transfer part 140 discharges the plurality of split magnets 20 accommodated in the magnet transfer and alignment part 131 of the magnet placement part 130 from the magnet transfer and alignment part 131 to the outside of the apparatus as shown in FIG. 12. More specifically, the transfer member 141 of the magnet transfer part 140 is inserted into the magnet placement part 130 and brought into contact with the sixth side face 10f of the split magnet 20 that is lastly accommodated in the magnet placement part 130. As the open/close door 135 of the magnet placement part 130 is opened, the transfer member 141 pushes the sixth side face 10f of the split magnet 20 so as to discharge the united split magnets 20 from the magnet transfer and alignment part 131 to the outside of the apparatus.

After that, the rotor 50 is prepared (see FIG. 4), and the respective united split magnets 20 are inserted into each of the magnet installation holes 50h formed in the rotor 50. Further, a motor is assembled using this rotor 50.

As described above, with the magnet handling apparatus 100 of Embodiment 1, the magnet alignment mechanism 101 aligns the split magnets such that a subsequently split magnet 20 is contacted to a previously split magnet 20 in an arrangement where the pair of split surfaces 20e and 20f formed by the splitting have their matching irregularities facing each other. This enables the split magnets 20 to be fitted together without any large gaps between the pair of split surfaces 20e and 20f, and there will be no large variation in the size of gaps between each pair of adjacent split magnets 20. Therefore, with the use of this magnet handling apparatus 100, gaps between the split surfaces 20e and 20f of adjacent split magnets 20 can be made smaller, whereby the total length of aligned split magnets 20 can be reduced. Also, variation in total length of aligned split magnets 20 can be reduced.

Furthermore, in Embodiment 1, the magnet handling apparatus 100 includes the magnet placement part 130, so that each set of split magnets 20 can be appropriately held in an aligned state.

Also, in Embodiment 1, the adhesive applying part 150 applies adhesive SZ on the second split surface 20f of a previously-accommodated split magnet 20 prior to the alignment of a subsequently split magnet 20. Therefore, the plurality of split magnets 20 can be united, as adjacent split magnets 20 are fixed to each other by gluing. Accordingly, the split magnets 20 aligned inside the magnet placement part 130 can be taken out from the magnet placement part 130 as one unit, and the aligned split magnets 20 can also be handled thereafter as one unit, so that each set of split magnets 20 can be handled easily.

In Embodiment 1, since the total length measuring part 160 measures the total length LA of the split magnets 20 accommodated in the magnet placement part 130, the total length LA of the aligned split magnets 20 can be inspected about whether it falls within a permissible range beforehand in this magnet handling apparatus 100 before the aligned split magnets 20 are taken out of this magnet handling apparatus 100.

In Embodiment 1, further, the magnet alignment mechanism 101 has the magnet splitting part 110 that splits apart the pre-splitting magnet 10. Thus the apparatus can be made simple as it can perform, within one apparatus, a series of operations from the splitting of the pre-splitting magnet 10 to the alignment of split magnets 20 obtained by the splitting.

In Embodiment 1, the air blow part 170 blows air to the pair of first split surface 20e and second split surface 20f formed by the splitting immediately after the pre-splitting magnet 10 is split apart, so that, even if magnet fragments are produced during the splitting, such fragments can be blown away from the split surfaces 20e and 20f. Therefore, magnet fragments are prevented from being accommodated inside the magnet placement part 130 together with the split magnets 20 when the split magnets 20 are accommodated in the magnet placement part 130. This will accordingly prevent situations where magnet fragments enter between the split surfaces 20e and 20f of adjacent split magnets 20 to increase the gap therebetween, or to increase variation in total length of aligned split magnets 20.

In Embodiment 1, the magnet placement part 130 is provided with the previously-described fragment discharge part 133. Therefore, any magnet fragments produced during the splitting and moving into the magnet placement part 130 (magnet transfer and alignment part 131) separate from the split magnets 20, drop down from the magnet transfer and alignment part 131 and are discharged into the fragment discharge part 133. This will accordingly prevent situations where magnet fragments enter between the split surfaces 20e and 20f of adjacent split magnets 20 to increase the gap therebetween, or to increase variation in total length of aligned split magnets 20.

(Embodiment 2)

Figure 13:
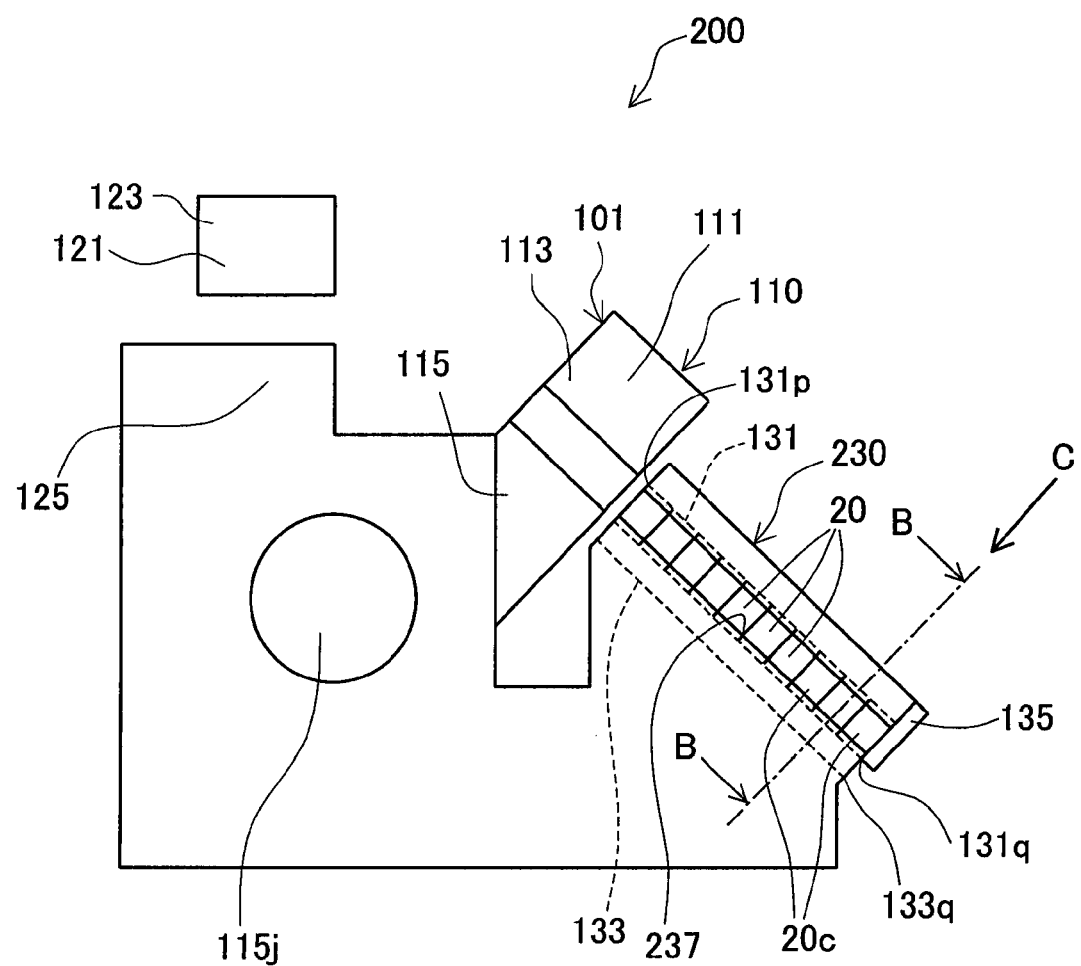
FIG. 13 is an explanatory view showing a magnet handling apparatus in a second embodiment, showing a state where a plurality of split magnets are accommodated in a magnet placement part.
Figure 14:
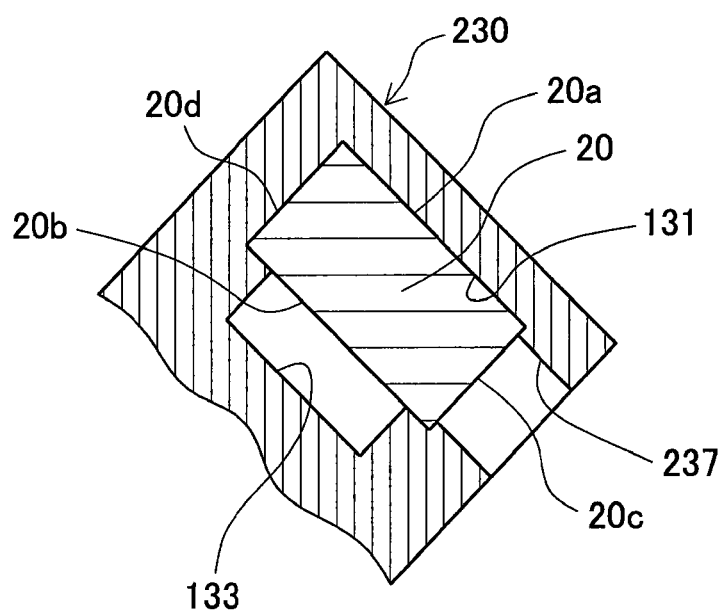
FIG. 14 is a cross-sectional view of a magnet handling apparatus in the second embodiment, taken along a line B-B in FIG. 13.
Figure 15:
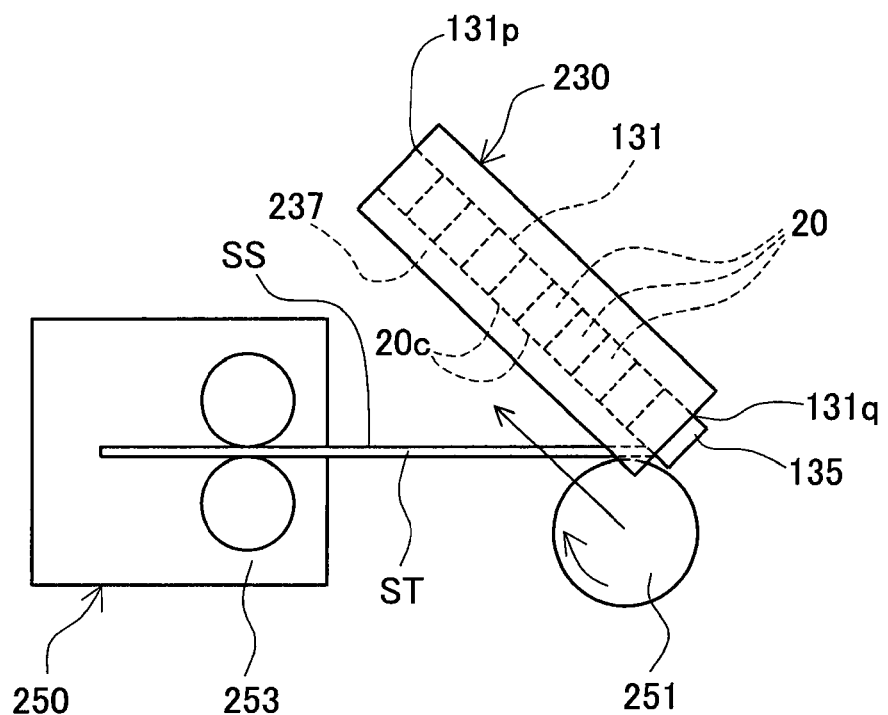
FIG. 15 is an explanatory view to show the magnet handling apparatus in the second embodiment, viewed from a direction C in FIG. 13.

Next, the second embodiment will be described. A magnet handling apparatus 200 of Embodiment 2 differs from the magnet handling apparatus 100 of Embodiment 1 described above in that the apparatus 200 has a tape bonding mechanism 250 instead of the adhesive applying part 150. The apparatus is otherwise basically the same as Embodiment 1 and description of the parts similar to those of Embodiment 1 will be omitted or simplified. FIGS. 13 to 15 show the magnet handling apparatus 200 according to Embodiment 2. FIG. 13 shows the entire apparatus 200. FIG. 14 is a cross-sectional view along B-B of FIG. 13, and FIG. 15 shows the apparatus viewed from a direction C in FIG. 13.

The magnet handling apparatus 200 of Embodiment 2 includes a magnet alignment mechanism 101 having a magnet splitting part 110 and a magnet transfer part 140, a magnet placement part 230, the tape bonding mechanism 250, a total length measuring part 160, and an air blow part 170. Of these, the magnet splitting part 110, the magnet transfer part 140, the total length measuring part 160, and the air blow part 170 are similar to those of the magnet handling apparatus 100 of Embodiment 1.

On the other hand, the magnet placement part 230 is different from the magnet placement part 130 of Embodiment 1 described above. Namely, this magnet placement part 230 includes a tape bonding groove 237 in addition to the magnet transfer and alignment part 131 and the fragment discharge part 133 similar to those of Embodiment 1 described above. This tape bonding groove 237 is formed in one side of the transfer and alignment part 131 such as to communicate with and extend along the transfer and alignment part 131. Respective split magnets 20 accommodated inside the magnet placement part 230 (transfer and alignment part 131) have their third split side faces 20c being mostly exposed to the outside because of this tape bonding groove 237.

The tape bonding mechanism 250 is arranged movably on a side of the transfer and alignment part 131 (a side of the tape bonding groove 237) (see FIG. 15). This tape bonding mechanism 250 is configured to attach an adhesive tape ST provided with an adhesive layer SS on one side thereof over the plurality of aligned split magnets 20. More specifically, the tape bonding mechanism 250 has a tape bonding roller 251 and a tape feeder 253. The tape feeder 253 is capable of sequentially reeling out the adhesive tape ST.

The tape bonding roller 251 has a part arranged inside the tape bonding groove 237 of the magnet placement part 230 to contact with the third split side faces 20c of split magnets 20 accommodated inside the transfer and alignment part 131. The roller can attach an adhesive tape ST reeled out from the tape feeder 253 over the respective split magnets 20 by moving obliquely upwards, as it rotates, along the third split side faces 20c of split magnets 20.

In the magnet handling apparatus 200 of Embodiment 2, ten split magnets 20 corresponding to one original pre-splitting magnet 10 are accommodated inside the magnet placement part 230 and, as shown in FIG. 15, the above-described tape bonding mechanism 250 attaches an adhesive tape ST over the respective split magnets 20 to fix adjacent split magnets 20 to each other (this corresponding to the previously-described fixing step).

Namely, part of the tape bonding roller 251 is arranged inside the tape bonding groove 237 of the magnet placement part 230 and contacted with the third split side faces 20c of split magnets 20 accommodated inside the transfer and alignment part 131. Meanwhile, the adhesive tape ST is reeled out from the tape feeder 253. The tape bonding roller 251 is then rotated and moved obliquely upwards along the third split side faces 20c of split magnets 20, thereby attaching the adhesive tape ST over the respective third split side faces 20c of split magnets 20. The plurality of split magnets 20 are thereby fixed to each other and united.

After that, as with Embodiment 1, the magnet transfer part 140 takes out the plurality of split magnets 20 accommodated in the magnet transfer and alignment part 131 of the magnet placement part 130 from the magnet transfer and alignment part 131 to the outside of the apparatus (as shown in FIG. 12). The respective united split magnets 20 are then inserted into each of the magnet installation holes 50h formed in the rotor 50. Further, a motor is assembled using this rotor 50.

As described above, with the magnet handling apparatus 200 of Embodiment 2, the tape bonding mechanism 250 attaches an adhesive tape ST over the plurality of split magnets 20 in an aligned state to fix them to each other. This unites the plurality of split magnets 20 and makes the handling thereafter of the split magnets 20 easy. Other features similar to Embodiment 1 described above provide similar advantageous effects as those of Embodiment 1.

(Embodiment 3)

Next, the third embodiment will be described. In the above-described magnet handling apparatus 100 or 200 of Embodiment 1 or 2, the split magnets 20 obtained by the splitting are aligned and also united after being accommodated in the magnet placement part 130 or 230. After that, the aligned split magnets 20 are taken out from the magnet handling apparatus 100 or 200, and inserted into a magnet installation hole 50h of the rotor 50 that is separately prepared. In contrast, in a magnet handling apparatus 300 of Embodiment 3, the split magnets 20 obtained by the splitting are not accommodated in a magnet placement part but are directly inserted into a magnet installation hole 50h of a rotor 50 and aligned therein. The apparatus is otherwise basically the same as Embodiment 1 and description of the parts similar to those of Embodiment 1 will be omitted or simplified. FIGS. 16 to 21 show the magnet handling apparatus 300 according to Embodiment 3.

The magnet handling apparatus 300 of Embodiment 3 is an apparatus arranged to insert a plurality of split magnets 20 obtained by splitting apart a pre-splitting magnet 10 into magnet installation holes 50h formed in a rotor 50 (see FIG. 4), and includes a magnet alignment mechanism 101 having a magnet splitting part 110 and a magnet transfer part 140, an adhesive applying part 150, a total length measuring part 160, an air blow part 170, and a motor component holder 380. Of these, the magnet splitting part 110 and the air blow part 170 are configured and operated similarly to those of the magnet handling apparatus 100 of Embodiment 1.

Figure 19:
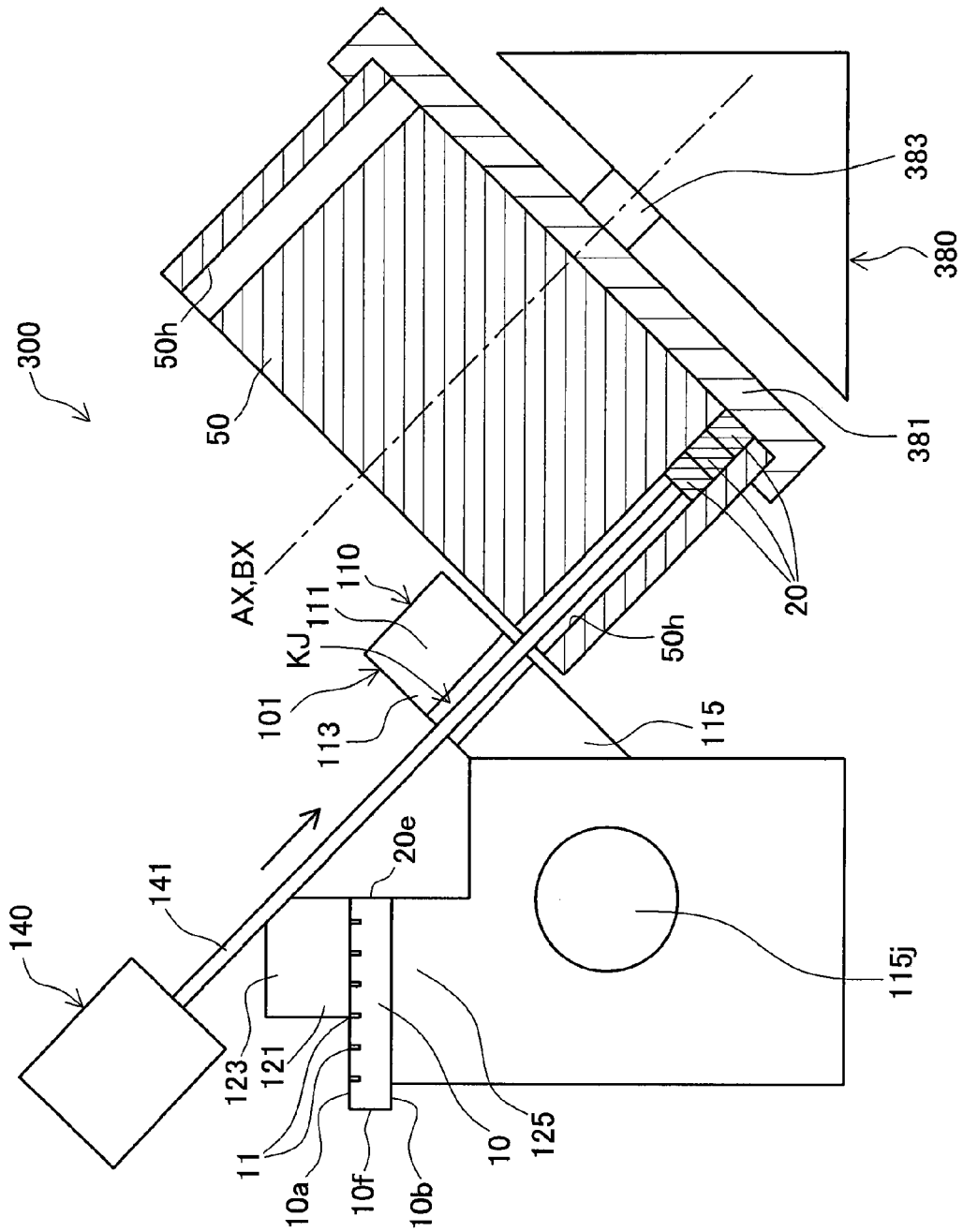
FIG. 19 is an explanatory view to show a state of inserting split magnets from the one-side holder into the magnet installation hole of the rotor and aligning the split magnets therein in the third embodiment.

On the other hand, in this magnet handling apparatus 300, the magnet transfer part 140, while it is configured similarly to Embodiment 1, moves the split magnets 20 individually from the one-side holder 111 of the magnet splitting part 110 and inserts them into a magnet installation hole 50h of the rotor 50 held by the motor component holder 380 (see FIG. 19). It then aligns the respective split magnets 20 in the same order as they were before the splitting such that the pair of split surfaces (first split surface 20e and second split surface 20f), formed by the splitting, of adjacent split magnets 20 contact each other.

More specifically, a split magnet 20 held by the one-side holder 111 of the magnet splitting part 110 is inserted into a magnet installation hole 50h of the rotor 50 with the transfer member 141 of the magnet transfer part 140. The transfer member then brings this split magnet 20 into contact with another split magnet 20 previously inserted into the magnet installation hole 50h prior to this split magnet 20 so as to align the respective split magnets 20 inside the magnet installation hole 50h. Namely, the transfer member aligns the respective split magnets 20 inside the magnet installation hole 50h such as to contact each other in an arrangement where the first split surface 20e of a split magnet 20 split off this time and the second split surface 20f of a previously split magnet 20 have their matching irregularities facing each other.

Figure 20:
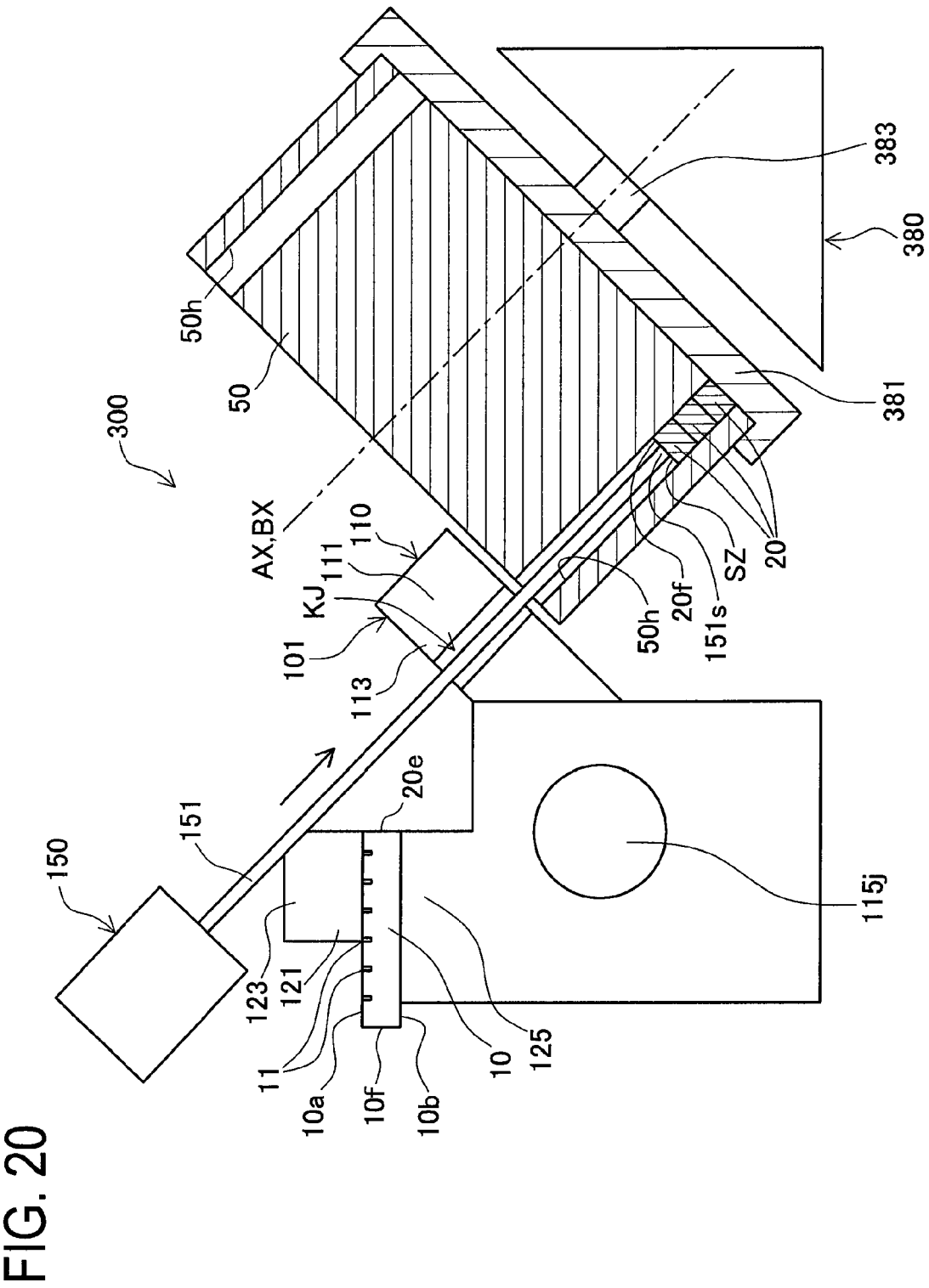
FIG. 20 is an explanatory view to show a state of applying an adhesive second split surfaces of the split magnets inserted in the magnet installation hole of the rotor in the third embodiment.

The adhesive applying part 150, in this magnet handling apparatus 300, while it is configured similarly to Embodiment 1, inserts its nozzle 151 into a magnet installation hole 50h of the rotor 50 (see FIG. 20). After bringing its nozzle 151 close to or into contact with the second split surface 20f of a split magnet 20 already inserted inside the magnet installation hole 50h, the adhesive applying part 150 dispenses the adhesive SZ from the dispensing tip 151s of the nozzle 151 to apply the adhesive on the second split surface 20f of this split magnet 20.

Figure 21:
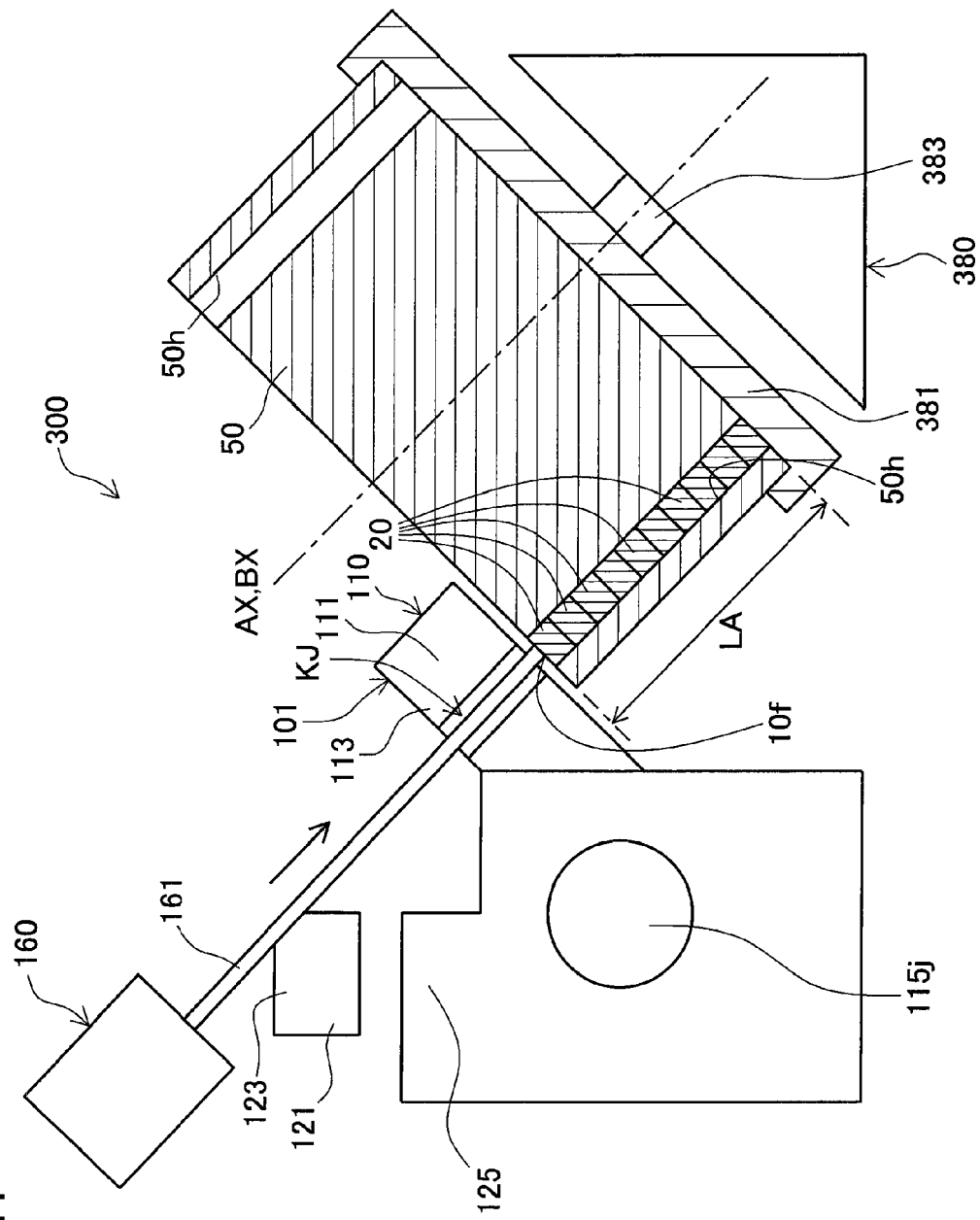
FIG. 21 is an explanatory view to show a state of measuring the total length of the plurality of split magnets inserted in the magnet installation hole of the rotor in the third embodiment.

The total length measuring part 160, in this magnet handling apparatus 300, while it is configured similarly to Embodiment 1, measures the total length LA in the magnet alignment direction of ten split magnets 20 corresponding to one original pre-splitting magnet 10 inserted in the magnet installation hole 50h of the rotor 50 (see FIG. 21). More specifically, the total length measuring part 160 brings its measurement insert 161 into contact with the sixth side face 10f of the split magnet 20 that is lastly inserted in the magnet installation hole 50h thereby to measure the total length LA of the aligned split magnets 20.

Figure 16:
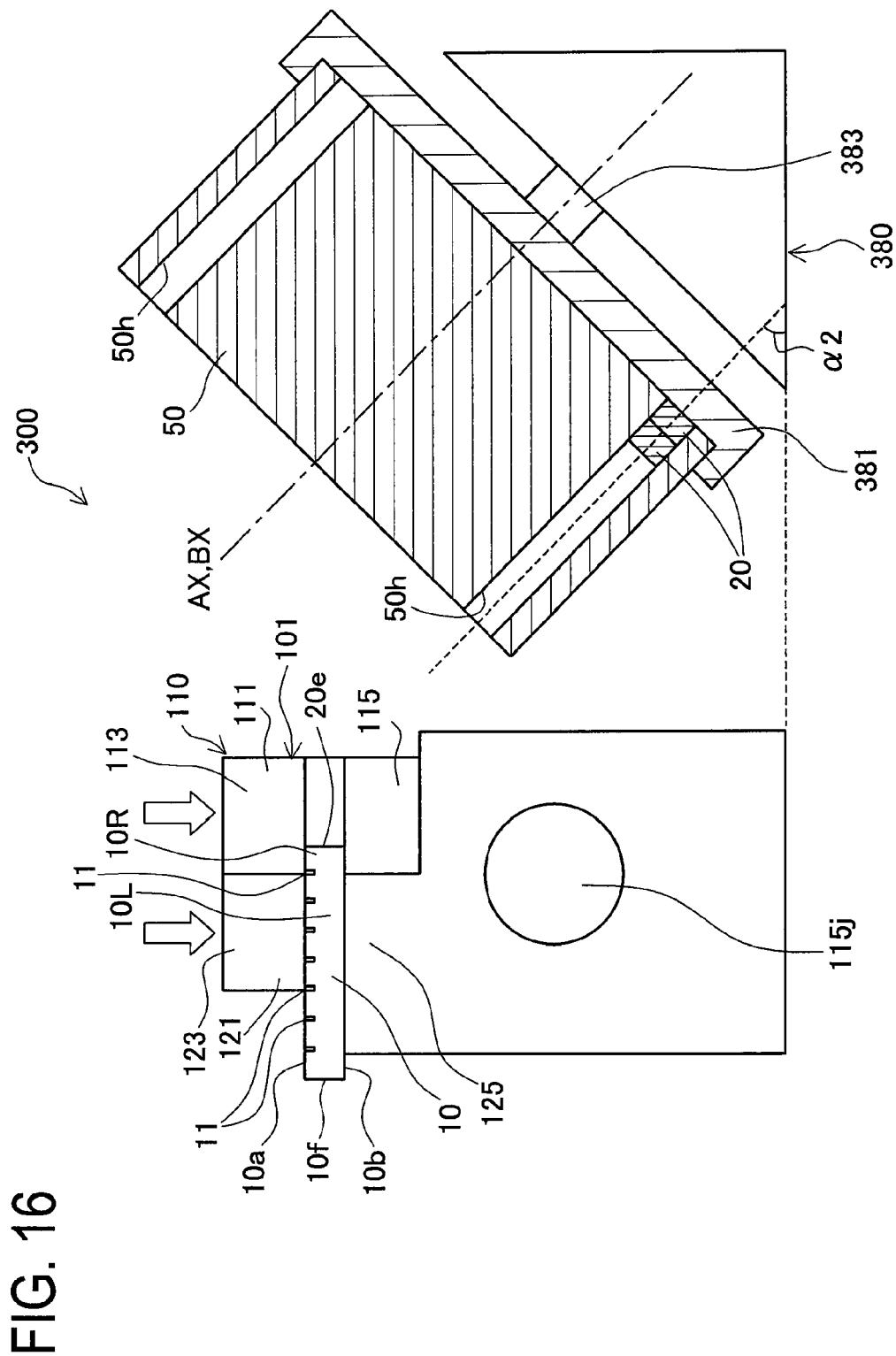
FIG. 16 is an explanatory view to show a magnet handling apparatus in a third embodiment, showing a state where a pre-splitting magnet is held.

The motor component holder 380 is configured to hold the rotor 50 in a predetermined attitude (see FIG. 16). This motor component holder 380 has a rotary table 381 on which the rotor 50 is placed, and a rotating shaft 383 capable of rotating this rotary table. With the rotor 50 placed thereon, the axis line AX of the rotor 50 coincides with the axis line BX of the rotary table 381; hence when the rotary table 381 is rotated, the rotor 50 rotates around the axis line AX as the center. The rotary table 381 is arranged inclined relative to the horizontal direction; hence when the rotor 50 is placed thereon, the magnet installation holes 50h of the rotor 50 are arranged inclined (at an inclination angle of α2) relative to the horizontal direction.

Next, handling of magnets by this magnet handling apparatus 300 will be described in more specific terms.

First, the pre-splitting magnet 10 is set in this magnet handling apparatus 300 as shown in FIG. 16. Namely, as with Embodiment 1, the one-side holder 111 and the other-side holder 121 of the magnet splitting part 110 respectively hold one side (right side in FIG. 16) and the other side (left side in FIG. 16) of a splitting groove 11 of the pre-splitting magnet 10. FIG. 16 shows a moment when two split magnets 20 have already been split off and a third split magnet 20 is going to be split off.

Meanwhile, the rotor 50 is set on the rotary table 381 of the motor component holder 380 of the magnet handling apparatus 300.

Figure 17:
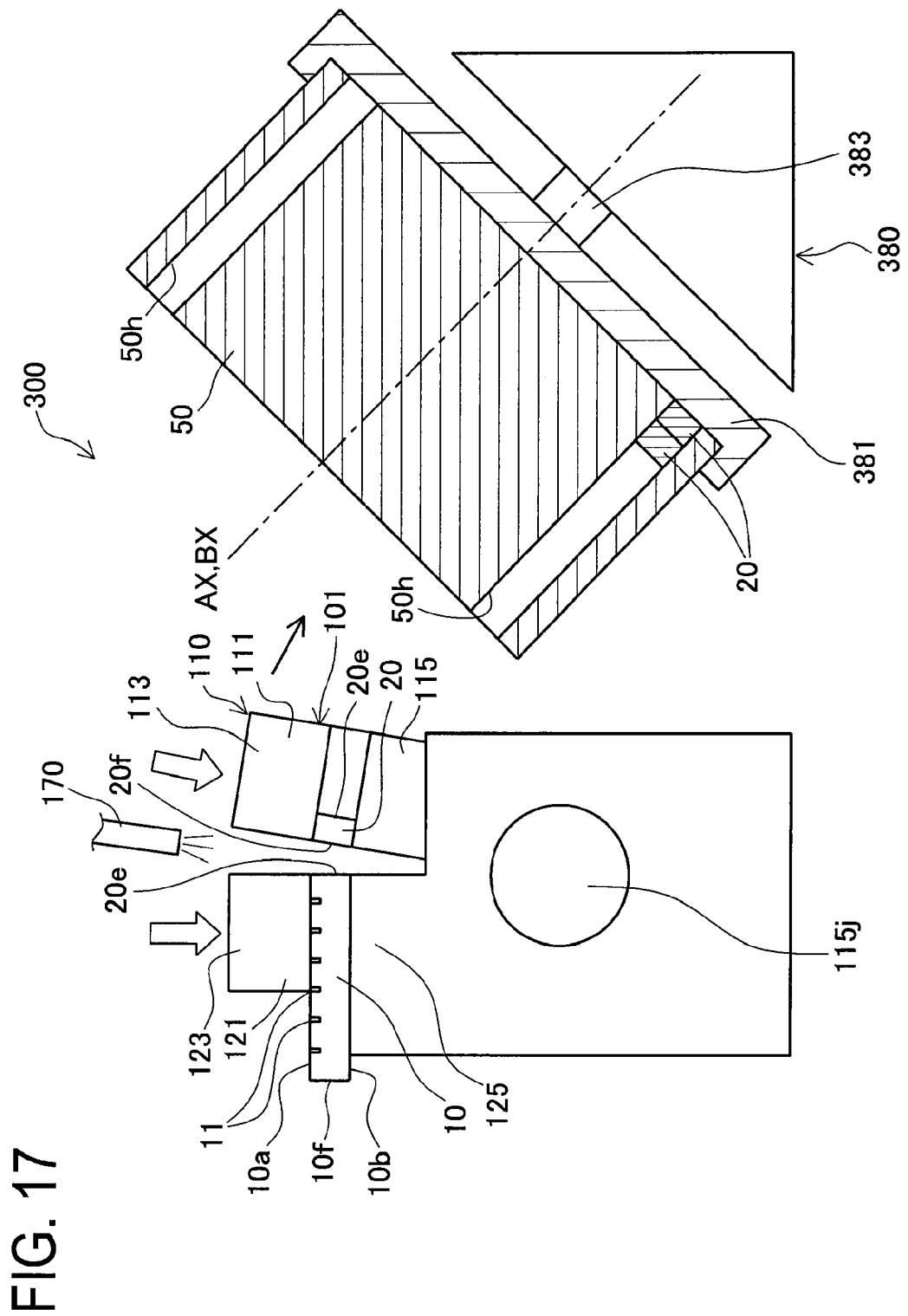
FIG. 17 is an explanatory view to show a state where the pre-splitting magnet is split and further air is blown thereto in the third embodiment.

After being held with the magnet splitting part 110, the pre-splitting magnet 10 is split apart, as with Embodiment 1, along the splitting groove 11 as the starting point as shown in FIG. 17 by a relative movement of the one-side holder 111 relative to the other-side holder 121 in such a manner as to widen the opening 11*i* of the splitting groove 11 more than the bottom part 11*j* thereof.

After the splitting, as with Embodiment 1, the air blow part 170 blows air from above to each of the first split surface 20*e* and the second split surface 20*f* formed by the splitting to blow away any magnet fragments that may have been produced during the splitting from the first split surface 20*e* and the second split surface 20*f*.

Figure 18:
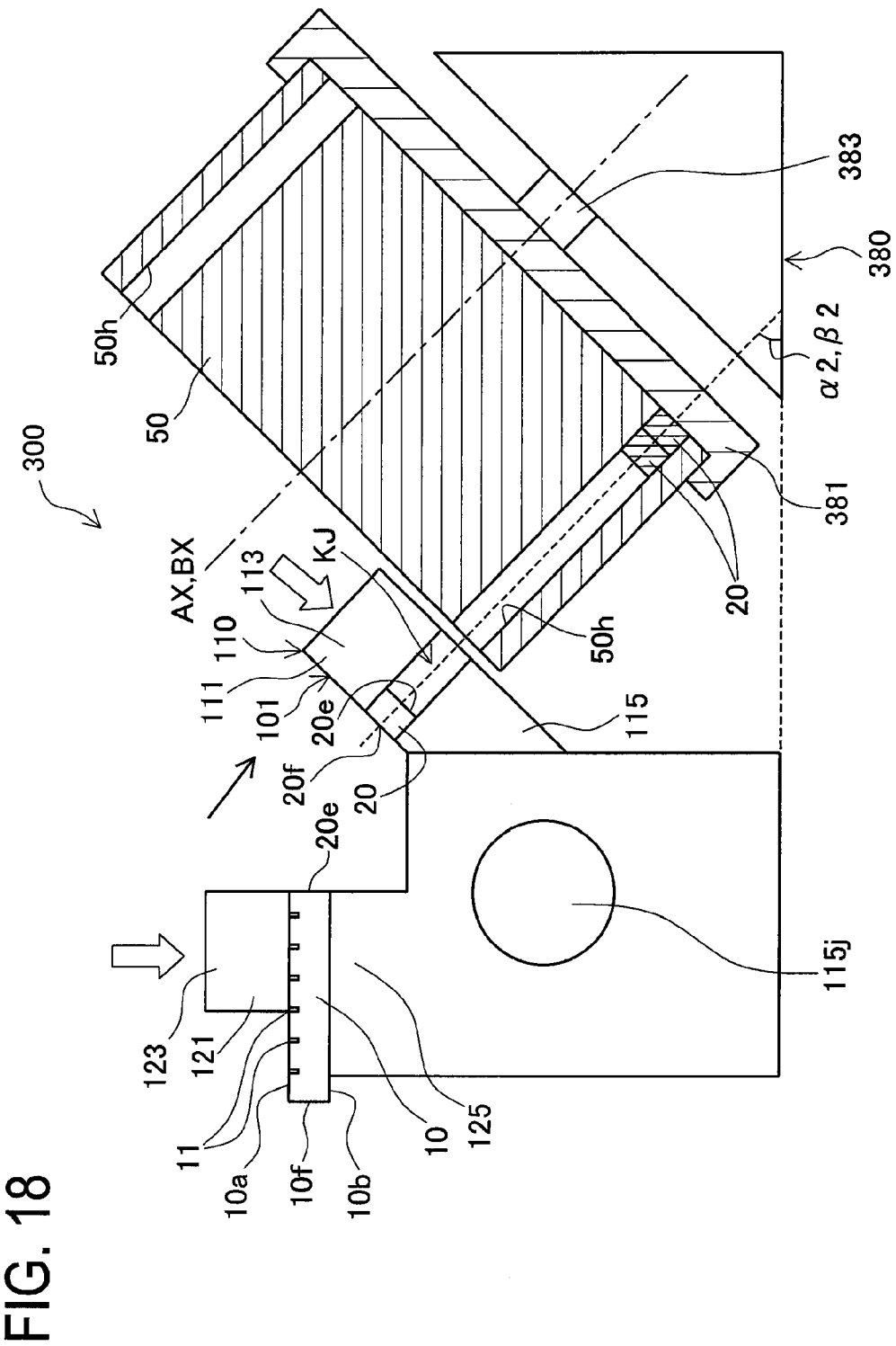
FIG. 18 is an explanatory view to show a state where a one-side holder is rotated to the vicinity of a magnet installation hole of a rotor in the third embodiment.

Next, the entire one-side holder 111 is rotated further clockwise in FIG. 18 around the rotation shaft 115*j* as the center while maintaining the state of holding the split magnets 20 obtained by the splitting, so as to locate the one-side holder 111 near the magnet installation hole 50*h* of the rotor 50 held by the motor component holder 380. More specifically, the magnet holding space KJ is made continuous with the magnet installation hole 50*h* with a small gap therebetween.

Next, with the magnet transfer part 140, the split magnet 20 obtained by the splitting is moved from the magnet holding space KJ of the one-side holder 111 and inserted into the magnet installation hole 50*h* of the rotor 50 (see FIG. 19). Inside the magnet installation hole 50*h*, the split magnets 20 are aligned to contact each other in the same order as they were before the splitting, in an arrangement where the pair of split surfaces (first split surface 20*e* and second split surface 20*f*), formed by the splitting, of adjacent split magnets 20 have their matching irregularities facing each other (magnet alignment step).

More specifically, at the same time as the holding of the split magnet 20 by the one-side holder 111 is released, the transfer member 141 of the magnet transfer part 140 is moved to push the second split surface 20*f* of the split magnet 20 inside the magnet holding space KJ to insert the split magnet 20 into the magnet installation hole 50*h*. This split magnet 20 is then brought into contact with a split magnet 20 that has been previously inserted into the magnet installation hole 50*h* so that respective split magnets 20 are aligned inside the magnet installation hole 50*h*. Namely, the respective split magnets 20 inside the magnet installation hole 50*h* are aligned to contact each other in an arrangement where the first split surface 20*e* of a split magnet 20 split off this time and the second split surface 20*f* of a previously split magnet 20 have their matching irregularities facing each other. At this time, since the adhesive SZ has been applied on the second split surface 20*f* of the previously accommodated split magnet 20, the first split surface 20*e* of the split magnet 20 accommodated this time and the second split surface 20*f* of the previously accommodated split magnet 20 are bonded to each other, so that adjacent split magnets 20 are fixed to each other (gluing step). After the respective split magnets 20 have been aligned, the transfer member 141 of the magnet transfer part 140 is retracted.

Next, as shown in FIG. 20, as with Embodiment 1, with the adhesive applying part 150, adhesive SZ is applied on the second split surface 20*f* of the above-described split magnet 20 inserted into the magnet installation hole 50*h*. After the adhesive SZ has been applied, the nozzle 151 of the adhesive applying part 150 is retracted.

Next, the one-side holder 111 is rotated counterclockwise in FIG. 20 around the rotation shaft 115*j* as the center to return the one-side holder 111 to its initial position as shown in FIG. 16. The holding of the pre-splitting magnet 10 by the other-side holder 121 is released so that the remaining pre-splitting magnet 10 can move to the right side in FIG. 20 toward the one-side holder 111 by a length of one split magnet 20.

Thereafter, as described in the foregoing, the remaining pre-splitting magnet 10 is held again with the one-side holder 111 and the other-side holder 121 to be split apart further. After that, the split magnet 20 newly obtained by the splitting is inserted into the magnet installation hole 50*h* of the rotor 50 and aligned (magnet alignment step). This is repeated until ten split magnets 20 are inserted into the magnet installation hole 50*h*.

After ten split magnets 20 corresponding to one original pre-splitting magnet 10 have been inserted into the magnet installation hole 50*h* of the rotor 50, the total length measuring part 160 measures the total length LA of the aligned split magnets 20 as shown in FIG. 21. More specifically, the measurement insert 161 of the total length measuring part 160 is contacted to the sixth side face 10*f* of the split magnet 20 that is lastly inserted into the magnet installation hole 50*h*, thereby to measure the total length LA of the aligned split magnets 20. After the total length LA has been measured, the measurement insert 161 of the total length measuring part 160 is retracted.

Next, the rotary table 381 of the motor component holder 380 is rotated by the rotating shaft 383 to locate another magnet installation hole 50*h*, which is expected to receive the split magnets 20 next, at a predetermined position. After that, the respective steps described in the foregoing are repeated until a plurality of (ten) split magnets 20 are inserted into this magnet installation hole 50*h* as well. Further, these operations are repeated until a plurality of (ten) split magnets 20 are inserted into all of the magnet installation holes 50*h* of the rotor 50. After that, this rotor 50 is removed from the motor component holder 380, and a motor is assembled using this rotor.

As described above, with the magnet handling apparatus 300 of Embodiment 3 as well, the magnet alignment mechanism 101 aligns the split magnets such that a subsequently split magnet 20 is contacted to a previously split magnet 20 in an arrangement where the pair of split surfaces 20*e* and 20*f* formed by the splitting face each other so that their projections and depressions (irregularities) engage with corresponding opposite depressions and projections. This enables the split magnets 20 to be fitted together without any large gaps between the pair of split surfaces 20*e* and 20*f*, and there will be no large variation in the size of gaps between each pair of adjacent split magnets 20. Therefore, with the use of this magnet handling apparatus 300, gaps between the split surfaces 20*e* and 20*f* of adjacent split magnets 20 can be made smaller, whereby the total length of aligned split magnets 20 can be reduced. Also, variation in total length of aligned split magnets 20 can be reduced.

Furthermore, in Embodiment 3, respective split magnets 20 are directly aligned inside a magnet installation hole 50*h* of a rotor 50 using the magnet handling apparatus 300; hence it is simpler than first aligning the split magnets 20 and then inserting them into magnet installation holes 50*h* of a rotor 50.

Also, in Embodiment 3 as well, the adhesive applying part 150 applies adhesive SZ on the second split surface 20*f* of a previously accommodated split magnet 20 prior to the alignment of a subsequently split magnet 20. Thus the plurality of split magnets 20 can be united, as adjacent split magnets 20 are fixed to each other by gluing. Accordingly, the respective split magnets 20 are prevented from being misaligned inside the magnet installation hole 50*h*.

In Embodiment 3, since the total length measuring part 160 measures the total length LA of the plurality of split magnets 20 inserted into the magnet installation hole 50*h*, the total length LA of the aligned split magnets 20 can be inspected about whether it falls within a permissible range in this magnet handling apparatus 300.

In Embodiment 3, the air blow part 170 blows air to the pair of split surfaces 20*e* and 20*f* formed by the splitting immediately after the pre-splitting magnet 10 is split apart; hence even if magnet fragments are produced during the splitting, such fragments can be blown away from the split surfaces 20*e* and 20*f*. Therefore, magnet fragments are prevented from being inserted into the magnet installation hole 50*h* of the rotor 50 together with the split magnets 20 when the split magnets 20 are inserted into the magnet installation hole 50*h* of the rotor 50. This will accordingly prevent situations where magnet fragments enter between the split surfaces 20*e* and 20*f* of adjacent split magnets 20 to increase the gap therebetween, or to increase variation in total length of aligned split magnets 20. Other features similar to Embodiment 1 or 2 described above provide similar advantageous effects as those of Embodiment 1 or 2.

The present invention is explained in the above first to third embodiments but not limited thereto. The present invention may be embodied in other specific forms without departing from the essential characteristics thereof.

For instance, in the first and third embodiments, the adhesive SZ is applied to the second split surface 20*f* of the split magnet 20 that has been split previously. Alternatively, the adhesive SZ may be applied to the first split surface 20*e* of the split magnet 20 that is split subsequently. As another alternative, the adhesive SZ may be applied to both the second split surface 20*f* of the previously split magnet 20 and the first split surface 20*e* of the subsequently split magnet 20.

The invention claimed is:

1. A magnet handling apparatus for handling a plurality of split magnets obtained by sequentially splitting apart a pre-splitting magnet from one end thereof,
    wherein the apparatus includes a magnet alignment mechanism configured to align the split magnets such that a subsequently split magnet contacts a previously split magnet in an arrangement where a pair of split surfaces formed by the splitting have their matching irregularities facing each other, and
    the magnet alignment mechanism includes:
    a magnet splitting part configured to split the pre-splitting magnet; and
    a magnet transfer part including a transfer member to push and move the subsequently split magnet split by the magnet splitting part to contact the previously split magnet.

2. The magnet handling apparatus according to claim 1,
    wherein the apparatus includes a total length measuring part configured to measure a total length of the split magnets in a magnet alignment direction while the split magnets are in an aligned state.

3. The magnet handling apparatus according to claim 1,
    wherein the apparatus includes a magnet placement part configured to hold the plurality of split magnets in an aligned state, and the magnet alignment mechanism is configured to align the split magnets sequentially inside the magnet placement part.

4. The magnet handling apparatus according to claim 1,
    wherein the apparatus includes a motor component holder configured to hold a motor component in a predetermined attitude, the motor component having a magnet installation hole for holding the plurality of split magnets in an aligned state, and
    the magnet alignment mechanism is configured to align the split magnets sequentially inside the magnet installation hole of the motor component held by the motor component holder.

5. A magnet handling apparatus for handling a plurality of split magnets obtained by sequentially splitting apart a pre-splitting magnet from one end thereof,
    wherein the apparatus includes a magnet alignment mechanism configured to align the split magnets such that a subsequently split magnet contacts a previously split magnet in an arrangement where a pair of split surfaces formed by the splitting have their matching irregularities facing each other,
    a motor component holder configured to hold a motor component in a predetermined attitude, the motor component having a magnet installation hole for holding the plurality of split magnets in an aligned state, and
    the magnet alignment mechanism is configured to align the split magnets sequentially inside the magnet installation hole of the motor component held by the motor component holder.

6. A magnet handling apparatus for handling a plurality of split magnets obtained by sequentially splitting apart a pre-splitting magnet from one end thereof,
    wherein the apparatus includes a magnet alignment mechanism configured to align the split magnets such that a subsequently split magnet contacts a previously split magnet in an arrangement where a pair of split surfaces formed by the splitting have their matching irregularities facing each other, and
    a total length measuring part configured to measure a total length of the split magnets in the magnet alignment direction while the split magnets are in an aligned state.

7. The magnet handling apparatus according to claim 5,
    wherein the magnet alignment mechanism includes a magnet splitting part configured to split apart the pre-splitting magnet.

8. The magnet handling apparatus according to claim 1,
    wherein the apparatus includes an adhesive applying part configured to apply adhesive on at least one of the pair of split surfaces prior to the alignment of the subsequently split magnet.

9. The magnet handling apparatus according to claim 1,
    wherein the apparatus includes a tape bonding mechanism configured to attach an adhesive tape provided with an adhesive layer on one side thereof over the plurality of split magnets in an aligned state.

10. The magnet handling apparatus according to claim 1,
    wherein the apparatus includes an air blow part configured to blow air to each of the pair of split surfaces prior to the alignment of the subsequently split magnet.

11. The magnet handling apparatus according to claim 2,
    wherein the apparatus includes a magnet placement part configured to hold the plurality of split magnets in an aligned state, and the magnet alignment mechanism is configured to align the split magnets sequentially inside the magnet placement part.

12. The magnet handling apparatus according to claim 2,
wherein the apparatus includes a motor component holder configured to hold a motor component in a predetermined attitude, the motor component having a magnet installation hole for holding the plurality of split magnets in an aligned state, and
the magnet alignment mechanism is configured to align the split magnets sequentially inside the magnet installation hole of the motor component held by the motor component holder.

13. The magnet handling apparatus according to claim 6,
wherein the magnet alignment mechanism includes a magnet splitting part configured to split apart the pre-splitting magnet.

14. The magnet handling apparatus according to claim 5,
wherein the apparatus includes an adhesive applying part configured to apply adhesive on at least one of the pair of split surfaces prior to the alignment of the subsequently split magnet.

15. The magnet handling apparatus according to claim 6,
wherein the apparatus includes an adhesive applying part configured to apply adhesive on at least one of the pair of split surfaces prior to the alignment of the subsequently split magnet.

16. The magnet handling apparatus according to claim 6,
wherein the apparatus includes a tape bonding mechanism configured to attach an adhesive tape provided with an adhesive layer on one side thereof over the plurality of split magnets in an aligned state.

17. The magnet handling apparatus according to claim 5,
wherein the apparatus includes an air blow part configured to blow air to each of the pair of split surfaces prior to the alignment of the subsequently split magnet.

18. The magnet handling apparatus according to claim 6,
wherein the apparatus includes an air blow part configured to blow air to each of the pair of split surfaces prior to the alignment of the subsequently split magnet.

* * * * *